(12) United States Patent
Wu et al.

(10) Patent No.: US 11,475,034 B2
(45) Date of Patent: *Oct. 18, 2022

(54) SCHEMALESS TO RELATIONAL REPRESENTATION CONVERSION

(71) Applicant: MuleSoft, LLC, San Francisco, CA (US)

(72) Inventors: Jiang Wu, Mountain View, CA (US); Aditya Vailaya, Cupertino, CA (US); Nilesh Khandelwal, Mountain View, CA (US)

(73) Assignee: Mulesoft, LLC, San Francisco, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/733,896

(22) Filed: Jan. 3, 2020

(65) Prior Publication Data

US 2020/0320091 A1 Oct. 8, 2020

Related U.S. Application Data

(63) Continuation of application No. 15/667,934, filed on Aug. 3, 2017, now Pat. No. 10,552,443.

(60) Provisional application No. 62/373,899, filed on Aug. 11, 2016.

(51) Int. Cl.
*G06F 16/00* (2019.01)
*G06F 16/25* (2019.01)
*G06F 16/22* (2019.01)

(52) U.S. Cl.
CPC ........ *G06F 16/258* (2019.01); *G06F 16/2237* (2019.01); *G06F 16/2246* (2019.01); *G06F 16/2255* (2019.01)

(58) Field of Classification Search
CPC ............... G06F 16/258; G06F 16/2237; G06F 16/2246; G06F 16/2255
USPC .......................................................... 707/746
See application file for complete search history.

(56) References Cited

U.S. PATENT DOCUMENTS

| 2007/0226196 | A1* | 9/2007 | Adya | G06F 16/24539 |
| 2014/0280047 | A1* | 9/2014 | Shukla | G06F 16/248 |
| | | | | 707/769 |
| 2017/0068718 | A1* | 3/2017 | Schaffer | G06F 16/258 |

* cited by examiner

*Primary Examiner* — Chelcie L Daye
(74) *Attorney, Agent, or Firm* — Sterne, Kessler, Goldstein & Fox P.L.L.C.

(57) ABSTRACT

A system is disclosed. The system includes a processor configured to: receive a set of data structured in a schemaless data representation; automatically translate the set of data into a relational representation by: translating an array map value in the set of data into an ordered multi-map; and converting the ordered multi-map to the relational representation. The processor is further configured to store the translated set of data in a key-value data store for a query-based retrieval.

20 Claims, 25 Drawing Sheets

| datetime | light | temperature | humidity | mote id | voltage |
|---|---|---|---|---|---|
| 2004-02-28 01:06:46.778 | 11.04 | 122.153 | -3.91901 | 1 | 2.03397 |
| 2004-02-28 00:59:16.027 | 45.08 | 19.9884 | 37.0993 | 1 | 2.69964 |

| datetime | light | temperature | humidity | mote id | voltage |
|---|---|---|---|---|---|
| 2004-03-31 03:38:15.757 | 45.08 | 19.3024 | 38.4629 | 1 | 2.68742 |

| datetime | light | temperature | humidity | mote id | voltage |
|---|---|---|---|---|---|
| 2004-04-01 09:51:18.378 | 43.24 | 19.1456 | 38.8039 | 3 | 2.69964 |
| 2004-04-01 09:56:20.478 | 43.24 | 19.1456 | 38.7357 | 3 | 2.69964 |

FIG. 4I

Label path = "Custom Attribute"

| Object ID | indexPath | longValue | doubleValue | stringValue | valueType | Is NULL |
|---|---|---|---|---|---|---|
| 1 | 0 | 12 | | | LONG | False |
| 1 | 2/1 | | 2.3 | | DOUBLE | False |
| 2 | | | | | | True |
| 3 | 6 | | | "Fox" | STRING | False |
| ... | ... | ... | ... | ... | ... | ... |

FIG. 4J

| Object ID | name | | age | | contact.phone | | contact.email | |
|---|---|---|---|---|---|---|---|---|
| | rowInfoVector | | rowInfoVector | | rowInfoVector | | rowInfoVector | |
| 1 | valueInfoVector | | valueInfoVector | | valueInfoVector | | valueInfoVector | |
| 2 | | | | | | | | |
| 3 | | | | | | | | |

| Object ID | name | | age | | contact.phone | | contact.email | |
|---|---|---|---|---|---|---|---|---|
| | rowInfoVector | | rowInfoVector | | rowInfoVector | | rowInfoVector | |
| 4 | valueInfoVector | | valueInfoVector | | valueInfoVector | | valueInfoVector | |

| Object ID | name | | age | | contact.phone | | contact.email | |
|---|---|---|---|---|---|---|---|---|
| | rowInfoVector | | rowInfoVector | | rowInfoVector | | rowInfoVector | |
| 5 | valueInfoVector | | valueInfoVector | | valueInfoVector | | valueInfoVector | |
| 6 | | | | | | | | |

FIG. 5B

| A.user.contact.phone.0 | Block Key | 0.1 | | 0.4 | |
|---|---|---|---|---|---|
| | Block Value | Bytes for contact.phone, object ID 1 | | Bytes for contact.phone, object ID 4 | |
| A.user.name.0 | Block Key | 0.1 | | 0.4 | |
| | Block Value | Bytes for name, object ID 1 | | Bytes for name, object ID 4 | |
| B.user.age.0 | Block Key | 0.5 | | | |
| | Block Value | Bytes for age, object ID 1 | | | |
| B.user.contact.phone.0 | Block Key | 0.5 | | | |
| | Block Value | Bytes for contact.phone, object ID 1 | | | |
| B.user.name.0 | Block Key | 0.5 | | | |
| | Block Value | Bytes for name, object ID 1 | | | |

FIG. 5C

SCHEMALESS TO RELATIONAL REPRESENTATION CONVERSION

CROSS-REFERENCE TO RELATED APPLICATIONS

This application is a continuation application of U.S. patent application Ser. No. 15/667,934, which filed on Aug. 3, 2017. Accordingly, this application claim benefit of U.S. patent application Ser. No. 15/667,934 under 35 U.S.C. § 120. U.S. patent application Ser. No. 15/667,934 claims priority under 35 U.S.C. § 119(e) to U.S. Provisional Patent Application No. 62/373,899, entitled SYSTEM AND METHODS FOR A DATA ANALYTICS APPLICATION THAT AUTOMATICALLY CONVERTS JSON TO RELATIONAL REPRESENTATION AND STORES IN A COLUMNAR FORM IN NOSQL OR SQL DATABASE, which filed Aug. 11, 2016. All mentioned U.S. provisional applications and U.S. non-provisional applications are incorporated herein by reference for all purposes.

BACKGROUND OF THE INVENTION

Traditionally data representation for relational database use has a schema, such as a structure and/or organization, to make searching and sorting data processing efficient. Schemaless data representation and databases are gaining popularity because they are more flexible with changes in data sources and/or structure, but are not as efficient in data processing. Leveraging the flexibility of schemaless data representation with the efficiency of relational database processing would be advantageous.

BRIEF DESCRIPTION OF THE DRAWINGS

Various embodiments of the invention are disclosed in the following detailed description and the accompanying drawings.

FIG. 4I is an illustration of example results of row and column splits.

FIG. 4J is an illustration of an example structure for representing heterogeneous value types.

FIG. 5B is an example of columnar blocks for a collection of example JSON objects.

FIG. 5C is an example of a two-level map view of columnar blocks.

DETAILED DESCRIPTION

Figure 1:
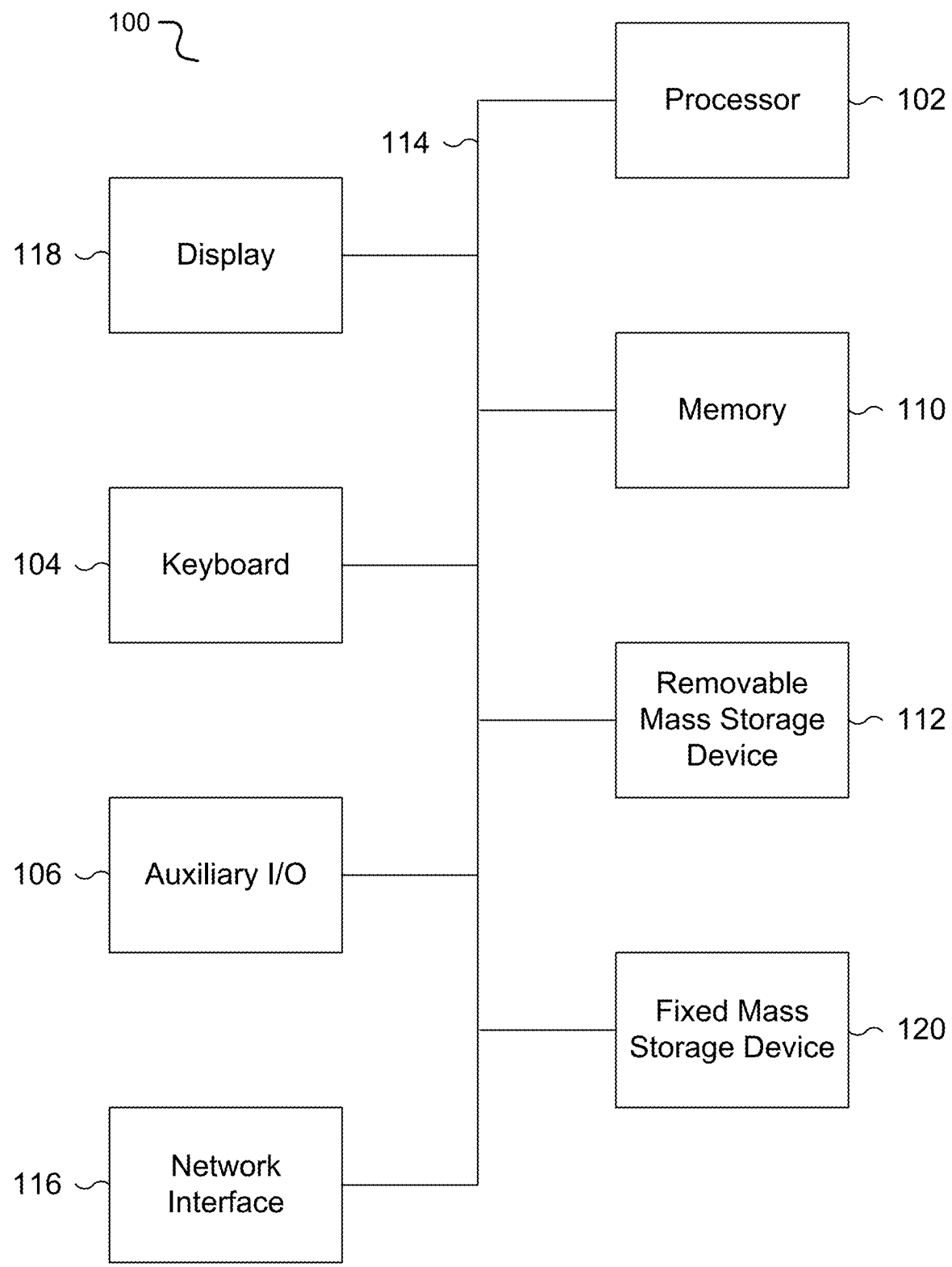
FIG. 1 is a functional diagram illustrating a programmed computer/server system for schemaless to relational representation conversion in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Converting a schemaless data representation to a relational representation is disclosed. Without limitation, JSON (Javascript Object Notation) is used as an example of a schemaless data representation, but any person having ordinary skill in the art will appreciate that other schemaless representation such as XML or other markup languages may be converted instead.

Systemically and/or automatically mapping arbitrary JSON objects into relational representation without any schema declaration and/or loss of information is disclosed. The mapped relational representation may be stored into any data storage such as row-based or columnar-based relational stores, such as relational databases, as well as encoded efficiently into horizontally scaling technologies such as Open Source distributed NoSQL key-value databases.

Using a relational form may allow the use of a relational query engine to query data without writing programmatic code for fetching data. By disclosing an automated mapping process, user time spent designing and declaring key-value or relational schema and/or performing data normalization or denormalization prior to ingestion into a database is reduced and/or eliminated.

Automation may reduce time from start of data ingestion to analysis from months to hours. The resulting relational representation may be fully convertible back to the original JSON object without loss of information.

As an example, the disclosed conversion process is shown in application to MELD (Massive Event and Log Daemon), a data analytics application to store and retrieve time-series event data and business information meta data for analysis. MELD implements a multistage data pipeline automatically converting incoming data in JSON and/or other formats to its relational representation, and stores the relational representation using columnar blocks into an Open Source distributed NoSQL key-value database and/or SQL database, thus reducing the cost of a data analytics solution.

MELD may be used in data warehouse applications storing and joining large amount of data from diverse sources with diverse formats. Examples include, but are not limited to: (i) IoT (Internet of Things) data analytics combining sensor data with business information such as customer information, geo-location, weather data, and social data; (ii) binding customer interaction data with household information, location, and social data for advertising; or (iii) replacing expensive data warehouse system with a more cost-effective Open Source solution using SAAS and/or an on-premise installation.

Overview. In one embodiment, the process is implemented in a data analytics application called MELD, which also automatically maps an arbitrary JSON object into a relational representation and stores the relational representation. Once mapped to relational representation, many existing optimized data storage technologies may be leveraged to store the underlying data in an efficient manner. These data stores may extend from horizontally scaling key-value stores (214), to row-based relational stores, and even columnar-based relational stores. Having a relational form also allows efficient integration with relational query engine to process the raw data in JSON format. An advantage of an automated mapping process is reducing and/or eliminating the time spent creating key-value or relational schema and performing data normalization or denormalization before ingesting JSON based data. This may speed up the process of storing JSON data into a proposed system and may allow users to quickly start querying the JSON data using relational query engines. The process described is given by way of example in MELD to store and retrieve time-series event data and business information meta data for analysis.

JSON has become a popular data interchange format. JSON is simple, flexible, human-readable, and easily produced and consumed using different programming languages. JSON is often used as a data representation for APIs and data dumps to exchange data between distributed and loosely coupled systems. JSON format represents data using atomic values (such as string, number, boolean), array, and map. Together, atomic values, array, and map allow JSON to represent both simple as well as complex hierarchical data with ease. Additionally, JSON representation has no structure declaration allowing heterogeneous values to be expressed without constraints.

Relational data representation is another popular data representation model. Relational data representation uses sets of related values. Relational representation is often described in the form of a table with structured rows and columns, where each row is one relation (or one tuple) of column values. Each value may be a string, number, boolean, or blob of bytes. There are many examples of file format and systems supporting relational representation ranging from comma separate file format and/or spreadsheet applications, to relational database systems. A relational representation may also be thought of as a set of column vectors, where each vector is made of row values for that column. Because relational representation has a well-defined structure, there is strong support in manipulating relational data, such as retrieving data subset and combining data through joins, using high level query languages such as SQL, highly optimized query processors, efficient storage mechanisms, and data presentation and visualization tools. Using a high level query language like SQL is fast for users to manipulate and examine data because there is no need to write and compile programming codes.

Bridging the two representations in an efficient loss-less transformation such that the strengths of both JSON-based data representation and availability of large number of advanced tools for relational data manipulation and representations may be leveraged is performed. One key to an efficient loss-less transformation is representing and maintaining the flexibility available in JSON when converting to a relational representation. This improves upon traditional approaches used, such as using a relational data normalization process to convert JSON data into relational representation, map each JSON field into a relational column, storing JSON as a byte array blob value, and/or creating specialized storage format for JSON. Each of these traditional techniques have their drawbacks in comparison to an efficient loss-less transformation.

One traditional technique is converting JSON data into relational tables which may involve breaking the JSON data apart into a number of "normalized" relational tables. This is traditionally a manual process and is referred to as the process of relational normalization. It allows the JSON data to be stored and queried using relational query engines and reduces redundancy in the data, but at a cost of introducing many relational tables to model complex JSON data structures. Normalization needs to be carried out case-by-case, by hand, and by a user with expertise. Performing relational normalization correctly is both time consuming and requires a high level of data modeling expertise that is both uncommon and expensive. The resulting structure is rigid and cannot accommodate changes in the JSON structure over time. With the normalized structure, a user traditionally needs then to spend time writing custom computer code to transform JSON objects into the normalized structure. If the normalization is incorrect, a user would then need to fix the programmatic code used to transform JSON objects, delete incorrect data from the system, deal with lost information due to the incorrect structure, and reload previous data into the updated structure adding to time and cost overruns. At the query time, a user would need to use complex joins to reconstruct the data from the normalized set of tables even to fetch just one JSON object, which may be inefficient.

Instead of breaking a JSON object into multiple tables, another traditional technique is to use a single table for a JSON object. In this approach, a user may map all or a subset of JSON fields into a column of the table for efficient use of relational query engines. This may be a manual process as well. Moreover, the mapping may end up static/rigid and may not adapt to changes in JSON structure. There is no standard way of mapping array of values or nested hierarchical structure into a relational representation. For example, a user may create column names made of concatenated field names separated by a dash (-) or an underscore (_) for a nested hierarchical value; concatenate all values of an array together as a single value of a column; and/or create column names with an index number to hold one value from the index of an array. There may be a restriction that each column of the table may only hold values of a single type. Similar to using relational normalization, a user may need to write custom computer code to transform JSON objects into the resulting relational columns. If the mapping changes or value type changes at a later time, the computer code may need to be updated and existing data may be migrated to the newer structure, which may also be inefficient.

Another traditional approach is to store JSON objects as a byte array blob. The blob may be stored inside a database such as MongoDB or on files in Hadoop HDFS. This approach makes it easy to add data; no special programs are needed since the user may copy the JSON objects into the storage. The approach defers the interpretation and parsing of the JSON data structure until read time. However, because the data is stored as a blob, there is no easy way to apply storage optimization techniques or efficiently leverage relational query systems to perform data joins. To retrieve any part of the JSON data, the entire JSON blob must instead be fetched, parsed, and then the relevant subset of the data extracted, which may be inefficient.

Lastly, traditionally there are specialized storage structures created to store JSON such as Parquet and Avro file formats. These storage formats are designed for JSON based data in order to achieve columnar storage and data compression. These storage structure have the benefit of being able to store complex JSON more efficiently. However, the data cannot be updated after inserting into the file. Further, the data stored in a file must be homogenous in its JSON structure. For example, the same file cannot contain two JSON objects, one with an integer value for a field and the other with a string value for the same field. Given these are files, the user must write more programming code to organize the various data files and instruct the query system to load different files at query time depending on analysis needs, which may be inefficient.

Instead, this approach maps JSON into relational representation that allows efficient use of key-value, columnar, or relational storage, and optimized support for relational query engines. This technique enables the user to insert, update, delete data in the original JSON structure while internally managing the data transformation, storage, and organization without user involvement. This technique also allows the user to query data using advanced query language such as SQL to perform data subset selection and combine data through join queries. This technique eliminates the need to write programming code typically associated with storing, querying, and managing JSON data using the alternate methods described above.

A table comparison between the approach used in the example MELD application to various relational mapping method and specialized JSON storage formats is provided below:

| Capabilities | Normalization | Mapping | Blob | MELD |
|---|---|---|---|---|
| JSON Atomic Values Support | Yes | Yes | Yes | Yes |
| JSON Array Values Support | Yes | | Yes | Yes |
| JSON Map Values Support | Yes | Yes | Yes | Yes |
| JSON Heterogeneous Structure Support | | | | Yes |
| Schema-less | | | Yes | Yes |
| Efficient Columnar Storage | Yes | Yes | | Yes |
| Efficient Relational Query | Yes | Yes | | Yes |
| Efficient Join Support | Yes | Yes | | Yes |
| Update and Deletion Support | Yes | Yes | Yes | Yes |

| Capabilities | MongoDB | Parquet | Avro | MELD |
|---|---|---|---|---|
| JSON Atomic Values Support | Yes | Yes | Yes | Yes |
| JSON Array Values Support | Yes | Yes | Yes | Yes |
| JSON Map Values Support | Yes | Yes | Yes | Yes |
| JSON Heterogeneous Structure Support | Yes | | | Yes |
| Schema-less | Yes | | Yes | Yes |
| Efficient Columnar Storage | | Yes | | Yes |
| Efficient Relational Query | | Yes | | Yes |
| Efficient Join Support | | Yes | | Yes |
| Update and Deletion Support | Yes | | | Yes |

FIG. 1 is a functional diagram illustrating a programmed computer/server system for schemaless to relational representation conversion in accordance with some embodiments. As shown, FIG. 1 provides a functional diagram of a general purpose computer system programmed to provide schemaless to relational representation conversion in accordance with some embodiments. As will be apparent, other computer system architectures and configurations can be used for schemaless to relational representation conversion.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-slate drive connected by a bus 114. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio recording device, audio card, speakers, a touch (or pointing) device, and/or other subsystems as needed. Besides a touch screen and/or capacitive touch interface, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
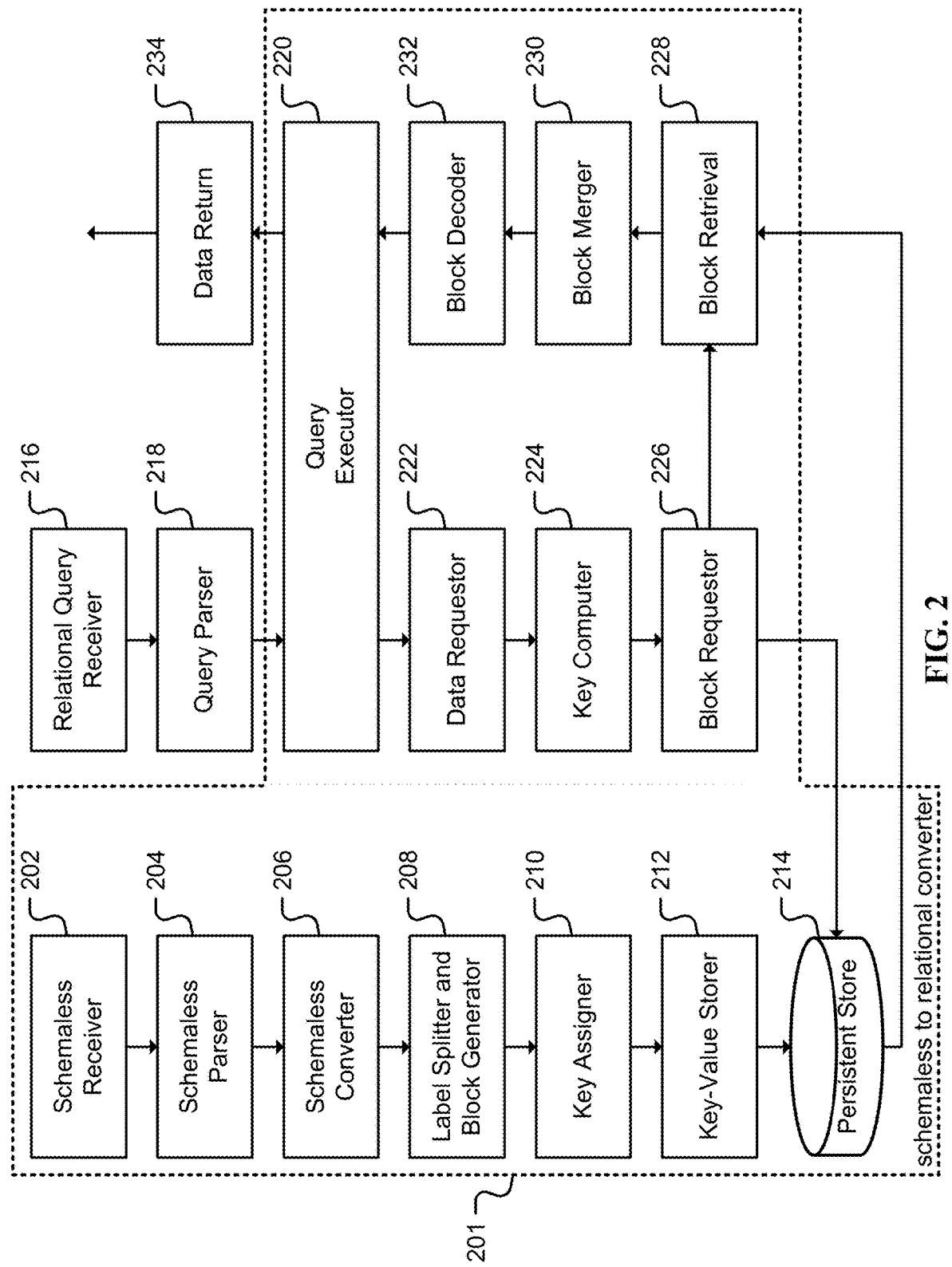
FIG. 2 is a block diagram illustrating an embodiment of a system for schemaless to relational representation conversion.

FIG. 2 is a block diagram illustrating an embodiment of a system for schemaless to relational representation conversion. In one embodiment, one or more computer/server systems of FIG. 1 represents one or more blocks in FIG. 2. The system (201) for schemaless to relational representation conversion comprises blocks (202), (204), (206), (208), (210), (212), (214), (220), (222), (224), (226), (228), (230), and (232).

A schemaless receiver (202) receives a schemaless data representation. For example, JSON data for a logical table may be received. An API may be used for receiving, for example by a REST API call. A protocol is used for receiving, for example HTTP, HTTPS, ODBC, and/or JDBC.

A schemaless parser (204) is coupled to the schemaless receiver (202) to parse the schemaless representation. For example, parser (204) may create in-memory JSON objects from the JSON data. A schemaless converter (206) is coupled to the schemaless parser (204) to convert the schemaless data representation to a relational representation, as will be detailed below.

A label splitter and block generator (208) is coupled to the schemaless converter (206) to split the relational representation by label path and generate, for example, columnar blocks. A key assigner (210) is coupled to the label splitter and block generator (208) to incorporate a logical table to assign keys to the blocks, for example columnar blocks. A key-value storer (212) is coupled to the key assigner (210) to save key-value pairs in persistent store (214), which it is also coupled with.

The system for schemaless to relational representation conversion (201) is also shown in FIG. 2 with another sample system to receive and return data for relational queries to provide MELD services without limitation, but any person having ordinary skill in the art will appreciate other systems for relational queries may be used once the schemaless data representation has been converted to a relational representation by system (201).

A relational query receiver (216) receives a relational query. For example, an SQL query may be received. An API may be used for receiving, for example by a REST API call. A protocol is used for receiving, for example HTTP, HTTPS, ODBC, and/or JDBC. A query parser (218) is coupled to the relational query receiver (216) to parse the query. For example, parser (218) may parse the SQL query to an in-memory SQL representation. The parser (218) is coupled to query executor (220) that generates query execution.

A data requestor (222) is coupled to the query executor (220) taking the generated query execution and requests associated data from one or more logical tables. A key computer (224) is coupled to the data requestor (222) and computes keys from the request data to locate blocks, for example columnar blocks, in persistent store (214). The block requestor (226) is coupled to the key computer (224) and requests blocks, for example columnar blocks, from persistent store (214) using the computed keys.

The block retrieval (228) subsystem is coupled both to the block requestor (226) and persistent store (214) and fetches blocks, for example columnar blocks, from persistent store (214). The block merger (230) is coupled to the block retrieval (228) subsystem and merges blocks, for example columnar blocks, across label paths. The block decoder (232) is coupled to the block merger (230) and decodes blocks, for example columnar blocks, to a schemaless representation such as JSON.

The query executor (220) is coupled to the block decoder (232) and returns data to the query execution. The data return (234) is coupled to the query executor (220) and returns data to the requester and/or user.

Figure 3:
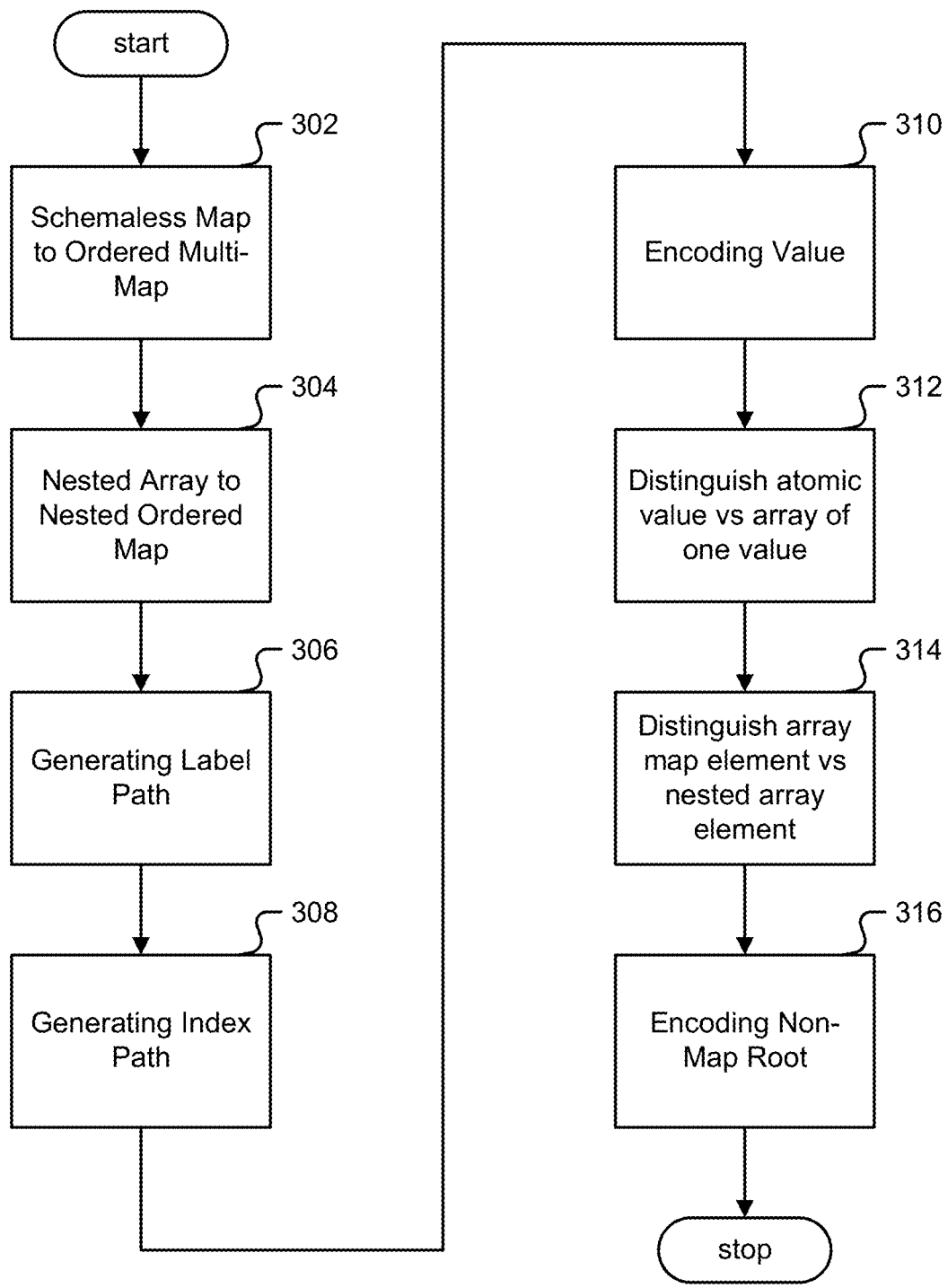
FIG. 3 is a flow chart illustrating an embodiment of a process for schemaless to relational representation conversion.

FIG. 3 is a flow chart illustrating an embodiment of a process for schemaless to relational representation conversion. In one embodiment, the process of FIG. 3 is carried out by one or more subsystems in FIG. 2. Without limitation the example of a JSON data representation is given for the schemaless data representation. The JSON data representation is schemaless, that is each JSON object is self-describing without the need to declare a structure for that object. A JSON value is one of following types:

atomic value—one of string, number, boolean, or null;
array of value—an ordered list of JSON values, each value may be its own type; or
map of string to value—an unordered map of string key to single value. Each string is a valid JSON string, and each value is another JSON value of any type.

For example: a JSON object representing a customer might comprise:

```
{
    "name":"Julien Smith",
    "age":23,
    "coordinate":[[12.3, 23.2], [21.2, 23.3], [21.5, 7.3]],
    "online":false,
    "contact":[
        {
            "phone":"555-1234",
            "email":"julien@acme.com"
        },
        {
            "phone":"555-6353"
        },
    ],
    "last updated":"2015-03-21 16:32:22"
}
```

In the above example, the root JSON value is a map. Inside this map, there are 6 keys. Each key has its own value. The key "name" has an atomic value "Julien Smith" with a String type. The "age" key has a number value of 23. The "coordinate" key has a list of values, each value is another list of two numbers. The "online" key has a Boolean value. The "contact" key has a list of values, each value is another map. "last updated" key has a string representing time. The JSON format does not support a time type natively.

In one embodiment, to access a value inside a JSON structure, one uses a path leading to that value. The path is made of labels that are either map key or array index for each level of the data hierarchy leading to the value. For example, the path "name" leads to the value "Julien Smith". The path "coordinate[0][0]" leads to the value 12.3. The path "contact[0].phone" leads to the value "555-1234". There is a unique label path to each value in the JSON object.

Unlike JSON, a relational representation models the data as sets of atomic values. A relational SQL query engine may retrieve data by filtering and combining sets, and producing another set as the result. There may not be any intrinsic ability to request a specific value by path or index in a SQL query.

This mapping process bridges the differences between the JSON and relational representations allowing a hierarchical data structure to be mapped into a set-based relational representation. Furthermore, there needs to be enough meta information in the mapping to recreate the original JSON from the mapped relational representation, for example to reverse the conversion.

In step 302, a schemaless map is converted to an ordered multi-map, for example with a schemaless converter (206). In the case of JSON, a JSON representation may contain map values that are themselves arrays of other values or objects. This JSON representation may be used to store data in a lossless manner. In the example used above, there is a contact field containing an array of contacts associated with each customer.

```
{
    "name":"Julien Smith",
    [...]
    "contact":[
        {
            "phone":"555-1234",
```

```
        "email":"julien@acme.com"
    },
    {
        "phone":"555-6353"
    },
    ],
    [...]
}
```

In one embodiment, given that the contacts field contain an array value, one may use an array index to refer to one of the contacts such as contact[0], contact[1].

A relational representation may not have the concept of an array. In a relational representation, the same contact to customer structure may be represented using a normalized 1-to-n relationship: for example, Julien Smith the customer may have a contact number of "555-1234" and also have a contact number of "555-6353".

To obtain a contact for the customer, one may issue a query looking for one or more contacts satisfying some conditions, i.e., contacts may be thought of as an unordered set of contact values.

In one embodiment, the array value of a map field is flattened as multiple map values with the same key. In other words, the containing map is converted into a multi-map:

```
{
    "name":"Julien Smith",
    [...]
    "contact":{
        "phone":"555-1234",
        "email":"julien@acme.com"
    },
    "contact":{
        "phone":"555-6353"
    },
    [...]
}
```

Using a multi-map, one may observe that there are two contacts for the given object. Both contacts may be referred to using the field name "contact". This conversion may eliminate the use of array index in the converted representation. This is important since relational representation may not have an array concept and may not have operators against array index based retrieval.

In one embodiment, in order to maintain the original information regarding the order of fields, the resulting multi-map is ordered based on the order of appearance of the keys. Using the same example, the conversion produces the following multi-map with 3 coordinate fields and 2 contact fields. The coordinate fields appear in fields with order index 2 to 4 inclusive, assuming 0 is the field index for the first field:

```
{
    "name":"Julien Smith",
    "age":23,
    "coordinate":[12.3, 23.2],
    "coordinate":[21.2, 23.3],
    "coordinate":[21.5, 7.3],
    "online":false,
    "contact":{
        "phone":"555-1234",
        "email":"julien@acme.com"
    },
    "contact":{
```

```
        "phone":"555-6353"
    },
    "last updated":"2015-03-21 16:32:22"
}
```

As shown in the structure above, fields of the converted multi-map may have the same adjacent field key name. Any unique name may have 1 or more field values. If a unique field name has more than 1 value, the additional values for that field may appear adjacent to each other.

In step 304, a nested array is converted to an ordered multi-map, for example with a schemaless converter (206). In the case of JSON, JSON allows nested arrays. In the example above, the field coordinate is a nested array:

```
{
    "name":"Julien Smith",
    "age":23,
    "coordinate":[[12.3, 23.2], [21.2, 23.3], [21.5, 7.3]],
    "online":false,
    [...]
}
```

In one embodiment, while the first level array elements in a field are flattened as values for several fields of the same name in an ordered multi-map, the nested second level array cannot be flattened in to the first level. Still, the nested arrays may be converted into non-array representation given that a relational representation does not typically have an array concept.

Thus, nested arrays containing two or more levels are converted into a nested ordered mutli-map under the first level map value using the array index as the field key. Using the example above, the field "coordinate" is first flattened into a multi-map with each value being an array of numbers:

```
{
    "name":"Julien Smith",
    "age":23,
    "coordinate":[12.3, 23.2],
    "coordinate":[21.2, 23.3],
    "coordinate":[21.5, 7.3],
    [...]
}
```

Then each array inside the multi-map is further expanded into a nested ordered multi-map:

```
{
    "name":"Julien Smith",
    "age":23,
    "coordinate":{"0":12.3, "1":23.2},
    "coordinate":{"0":21.2, "1":23.3},
    "coordinate":{"0":21.5, "1":7.3},
    [...]
}
```

To refer to the values inside the nested array element, the nested field label may be used, separated by period. For example, "coordinate.0" refers to 3 possible values 12.3, 21.2, and 21.5; and "coordinate.1" refers to the another 3 possible values 23.2, 23.3, and 7.3.

Even though there are 3 values for "coordinate.0", the three values are inside separate objects. Although this may seem to be ambiguous comparing to referencing multiple values for the same key, it is described below how to encode the original object location for each value.

Looking at other examples of nested arrays:

| JSON | Converts |
|---|---|
| {<br>...<br>"region":[<br>  [[0, 0], [1, 0], [0, 1]],<br>  [[0, 0], [1, 0], [1, 1], [0, 1]],<br>],<br>...<br>} | {<br>...<br>"region":{<br>  "0":{"0":0, "1":0},<br>  "1":{"0":1, "1":0},<br>  "2":{"0":0, "1":1}<br>},<br>"region":{<br>  "0":{"0":0, "1":0},<br>  "1":{"0":1, "1":0},<br>} |
| {<br>...<br>"region":[<br>  [{"x":0,"y":0},<br>   {"x":1,"y":1},<br>   {"x":0,"y":1}],<br>  [{"x":0,"y":0},<br>   {"x":1,"y":0},<br>   {"x":1,"y":1},<br>   {"x":0,"y":1}}<br>{<br>...<br>"data":[[[1, [2, 3]], 4], 5],<br>...<br>} | {<br>...<br>"region":{<br>  "0":{"x":0, "y":0},<br>  "1":{"x":1, "y":0},<br>  "2":{"x":0, "y":1}<br>},<br>"region":{<br>  "0":{"x":0, "y":0},<br>  "1":{"x":1, "y":0},<br>...<br>"data": {<br>  "0":{"0":1,"1":{"0":2,"1":3}},<br>  "1":4<br>}, |
| {<br>...<br>"data1":[{"data2":[[1,2],[3,4]]},<br>  {"data2":[[3,2],[4,3]]}],<br>...<br>} | {<br>...<br>"data1":{"data2":{"0":1,"1":2},<br>     "data2":{"0":3,"1":4}}<br>"data1":{"data2":{"0":3,"1":2},<br>     "data2":{"0":4, "1":3} |
| {<br>...<br>"data1":[[{"data2":[[1,2],[3,4]]}]]<br>...<br>} | "data1":{<br>  "0":{"data2":{"0":1,"1":2},<br>     "data2":{"0":3,"1":4}<br>} |

The end result after converting map array values and nested array values is a data representation using ordered multi-maps only. Each map contains key and values. A key is a string and value associated is either a simple atomic value or another ordered multi-map. The output after converting the original JSON example into ordered multi-maps is as follows:

```
{
    "name":"Julien Smith",
    "age":23,
    "coordinate":{"0":12.3, "1":23.2},
    "coordinate":{"0":21.2, "1":23.3},
    "coordinate":{"0":21.5, "1":7.3},
    "online":false,
    "contact":{"phone":"555-1234","email":"julien@acme.com"},
    "contact":{"phone":"555-6353"},
    "last updated":"2015-03-21 16:32:22"
}
```

In step 306, a label path is generated, for example with a schemaless converter (206). In one embodiment, after the generation of an ordered multi-map in steps 302 and 304, such map is converted into a relational representation. This conversion from a nested ordered multi-map to a relational representation consists of two steps: (i) generating a label path for the object in step 306; and (ii) generating an index path for each value in step 308.

A label path is made of the map key from each level leading to the value. Using the example from before:

```
{
    "name":"Julien Smith",
    "age":23,
    "coordinate":{"0":12.3, "1":23.2},
    "coordinate":{"0":21.2, "1":23.3},
    "coordinate":{"0":21.5, "1":7.3},
    "online":false,
    "contact":{"phone":"555-1234","email":"julien@acme.com"},
    "contact":{"phone":"555-6353"},
    "last updated":"2015-03-21 16:32:22"
}
```

The following unique set of label paths leading to simple atomic data are produced:

```
name
age
coordinate.0
coordinate.1
online
contact.phone
contact.email
last updated
```

The label paths that point to nested complex data are not generated. For example, the label path "coordinate" does not lead to a simple value. Hence, it is not an output from the label path generation.

In one embodiment, using the label path, the original hierarchical JSON object may be viewed as a flat list of key values, where each key is a label path and each value is simple and atomic. The example object is thus translated to:

| Label Path | Value |
|---|---|
| name | Julien Smith |
| age | 23 |
| coordinate.0 | 12.3 |
| | 21.2 |
| | 21.5 |
| coordinate.1 | 23.2 |
| | 23.3 |
| | 7.3 |
| online | false |
| contact.phone | 555-1234 |
| | 555-6353 |
| contact.email | julien@acme.com |
| last updated | 2015-03-21 16:32:22 |

As shown above, these label paths are not unique with respect to the values; that is, a unique label path may point to multiple simple atomic values. For example, the label path "coordinate.0" points to 3 values: 12.3, 21.2, and 21.5. Thus, each label path points to a set of values.

In one embodiment, when multiple JSON objects are converted, the result may also be viewed as a table of columns, with each cell containing multiple values. The difference between this relational representation and the relational representation used by relational databases is that this representation does not conform to the first normal form (1NF) where the value may be an atomic value. For example:

| name | age | coordinate.0 | coordinate.1 | online | contact.phone | contact.email | last updated |
|---|---|---|---|---|---|---|---|
| Julien Smith | 23 | 12.3, 21.2, 21.5 | 23.2, 23.3, 7.3 | false | 555-1234, 555-6365 | julien@acme.com | 2015-03-21 16:32:22 |
| Mary Jane | 22 | 23.1 | 9.4 | true | 555-2353 | mary@acme.com | 2015-04-02 12:34:50 |
| ... | ... | ... | ... | ... | ... | ... | ... |

Benefits derived from the above relational representation comprise:
a. The data from the original hierarchical JSON is separated and flattened into columns of just a single level;
b. It may be likely that each column contains similar type of data values. Values from various columns may be stored efficiently into a relational storage system (214) such as an SQL database, a key-value store, or a columnar file store, leveraging storage features such as value compression, ordering, and indexing;
c. A data schema is derived out of the processing;
d. There is no need to use individual array index. All array elements are grouped to form logical columns;
e. The process may be fully automated without an a priori schema creation;
f. A user may query the data in the above representation using SQL like query to retrieve data:
select * from Customer where contact.phone='555-1234'
The caller does not need to know the intricacy of the original JSON object hierarchy to create the above query; and
g. A user may join different data tables together such as:
select * from Customer join City on Customer.contact.city=City.city where City.state='CA'

In step 308, the index path is generated, for example with a schemaless converter (206). As shown above, using a label path alone does not fully capture all the information from a nested ordered multi-map. For instance, a single unique label path may contain multiple values, each coming from a different inner location of the JSON object. Continuing the example multi-map:

```
{
  "name":"Julien Smith",
  "age":23,
  "coordinate":{"0":12.3, "1":23.2},
  "coordinate":{"0":21.2, "1":23.3},
  "coordinate":{"0":21.5, "1":7.3},
  [...]
}
```

As shown above, the three values for "coordinate.0" comes from each of the repeated "coordinate" keys in the multi-map. In order to capture the information on where each value comes from, the concept of an index path is introduced. An index path may be made of a series of integers separated by slash. Each integer records the index in the ordered multi-map.

To illustrate the process of index path generation, first apply an integer, shown in parenthesis, to each multi-map key representing the index of that key inside the multi-map:

```
{
(0)  "name":"Julien Smith",
(1)  "age":23,
```

-continued

```
(2)  "coordinate":{"0":12.3, "1":23.2},
(3)  "coordinate":{"0":21.2, "1":23.3},
(4)  "coordinate":{"0":21.5, "1":7.3},
(5)  "online":false,
(6)  "contact":{"phone":"555-1234","email":"julien@acme.com"},
(7)  "contact":{"phone":"555-6353"},
(8)  "last updated":"2015 Mar. 21 16:32:22"
}
```

In one embodiment, for each value, an index path made of the integer index from its key and ancestor keys is constructed. The resulting relational representation is then augmented with index path:

| Label Path | Value | Index Path |
|---|---|---|
| Name | Julien Smith | 0 |
| Age | 23 | 1 |
| coordinate.0 | 12.3 | 2/0 |
| | 21.2 | 3/0 |
| | 21.5 | 4/0 |
| coordinate.1 | 23.2 | 2/1 |
| | 23.3 | 3/1 |
| | 7.3 | 4/1 |
| Online | false | 5 |
| contact.phone | 555-1234 | 6/0 |
| | 555-6353 | 7/0 |
| contact.email | julien@acme.com | 6/1 |
| last updated | 2015-03-21 16:32:22 | 8 |

In step 310, a value type is encoded, for example with a schemaless converter (206). For example, a JSON atomic value may be one of the following: number, string, or a boolean. Since a JSON object does not require any schema, the type information is associated with each value in the JSON object. In one embodiment, this type information is captured as another piece of information associated with each value, and a JSON value type is further classified into finer grain types: long, double, string, boolean, and timestamp.

In one embodiment, determining if a value is long, double, or boolean may be simple as the JSON object value intrinsically provides such type information. Timestamp is an important data type in data storage and analysis. JSON may not have a native timestamp data type. As a result, timestamp is often encoded as a string. In one embodiment, the option of converting the JSON string representation of the timestamp into a timestamp data type is granted. A timestamp data type is internally represented as a long value since epoch of 1970-01-01 00:00:00. The conversion may be specified by the caller by indicating which label path may be converted as long. If the conversion fails, the data value remains the string type.

Adding in the type information leads to the following tabular representation of the example, assuming a timestamp conversion is also applied:

| Label Path | Value | Index Path | Type |
|---|---|---|---|
| Name | Julien Smith | 0 | string |
| Age | 23 | 1 | long |
| coordinate.0 | 12.3 | 2/0 | double |
|  | 21.2 | 3/0 | double |
|  | 21.5 | 4/0 | double |
| coordinate.1 | 23.2 | 2/1 | double |
|  | 23.3 | 3/1 | double |
|  | 7.3 | 4/1 | double |
| Online | false | 5 | boolean |
| contact.phone | 555-1234 | 6/0 | string |
|  | 555-6353 | 7/0 | String |
| contact.email | julien@acme.com | 6/1 | String |
| last updated | 1426955542000 | 8 | timestamp |

In step 312, atomic values are distinguished from arrays of a single value, for example with a schemaless converter (206). For example, a JSON value may be a simple value or an array value. When the array value is made of a single element, the conversion process may produce an ambiguous outcome. For example, consider an original JSON representation as the following:

```
{
    "data simple":1,
    "data array 1":[1],
    "data array 2":[1, 2]
}
```

The above JSON is then converted into the multi-map:

```
{
    "data simple":1,
    "data array 1":1,
    "data array 2":1,
    "data array 2":2,
}
```

The above is further flattened into the relational form:

| Label Path | Value | Index Path | Type |
|---|---|---|---|
| data simple | 1 | 0 | long |
| data array 1 | 1 | 1 | long |
| data array 2 | 1 | 2 | long |
| data array 2 | 1 | 3 | long |

As shown, the conversion for "data simple" and "data array 1" create identical outcomes. The information on "data simple" in the original JSON points to an atomic value, whereas "data array 1" points to an array. This information is lost during the transformation described thus far.

In one embodiment, to preserve this information a boolean flag is added to each level of the index path indicating whether the value at that level is inside an array or not in the original JSON. With this additional flag, the converted relational form is as follows:

| Label Path | Value | Index Path | Type | In Array |
|---|---|---|---|---|
| data simple | 1 | 0 | long | false |
| data array 1 | 1 | 1 | long | true |
| data array 2 | 1 | 2 | long | true |
| data array 2 | 1 | 3 | long | true |

Here is another example where the "In Array" flag happens at a 2nd level:

```
{
    "data simple":{"x":1},
    "data array 1":[{"x":1}]
}
``` which is converted to

| Label Path | Value | Index Path | Type | In Array |
|---|---|---|---|---|
| data simple.x | 1 | 0/0 | long | false/false |
| data array 1.x | 1 | 1/0 | long | true/false |

In step 314, array map elements are distinguished from nested array elements, for example with a schemaless converter (206). For example, a JSON array may contain heterogeneous value types. When a JSON array contains both nested array elements and map elements, there may be ambiguity in the resulting conversion. For example,

```
{
    "array":[{"0":["abc"] , "1":["efg"]}, ["abc", "efg"]]
}
```

Applying the multi-map flattening produces the following multi-map:

```
{
    0 "array":{0 "0":"abc", 1 "1":"efg"},
    1 "array":{0 "0":"abc", 1 "1":"efg"}
}
```

Applying the relational conversion produces:

| Label Path | Value | Index Path | Type | In Array |
|---|---|---|---|---|
| array.0 | abc | 0/0 | string | true/true |
| array.1 | efg | 0/1 | String | true/true |
| array.0 | abc | 1/0 | string | true/true |
| array.1 | efg | 1/1 | String | true/true |

As shown above, there are four values in the original JSON. During the multi-map flattening process, two top level nested multi-map are created. Both of these nested map are from the original JSON array element. Hence the "In Array" flag for both are set to true for this first level. For the second level, the original nested map is expanded into a nested ordered multi-map and the original nested array is also expanded into a nested ordered multi-map. The value inside these two nested map also come from array elements from the original JSON. Hence the second level "In Array" flag is also set to true.

At this point, based on the output from the conversion, one cannot properly differentiate if the origin of the data values are nested list or nested map. In one embodiment, to address this issue the label path is updated to indicate if a path element is generated out of a map key from the original JSON or is artificially created out of a JSON array element index. If the path is generated out of an array element index, the separator is changed to # instead of a period (.) and/or dot. Using this additional information, the resulting relational representation for the above example is as follows:

| Label Path | Value | Index Path | Type | In Array |
|---|---|---|---|---|
| array.0 | abc | 0/0 | string | true/true |
| array.1 | efg | 0/1 | String | true/true |
| array#0 | abc | 1/0 | string | true/true |
| array#1 | efg | 1/1 | String | true/true | wherein array #0 indicates the path "0" is an array index, and array.0 indicates the path "0" is a JSON map key.

In step 316, non-map root values are encoded, for example with a schemaless converter (206). In one embodiment, the transformation steps (302)-(314) require the input JSON object to be a map value to start. However, it is not required for a JSON object to have a map at the root level. A JSON object may be a simple value such as just a string, a number, or a boolean. A JSON object may also be an array at the root level. For example, the following are all valid JSON objects:

```
12
"abc"
true
[1, 2, 3]
{"":"abc","name":"Nathan","age":32}
```

In one embodiment, to address varying root values, all incoming JSON objects are first wrapped inside an artificial root map with a single empty string key " ". Hence the above examples are first wrapped into:

```
{"":12 }
{"":"abc"}
{"":true}
{"": [1, 2, 3]}
{"":"abc","name":"Nathan","age":32}
```

Then, the conversion process is performed, converting each to its corresponding relational form:

| Label Path | Value | Index Path | Type | inArray |
|---|---|---|---|---|
| Empty | 12 | 0 | long | false |
| Empty | abc | 0 | String | false |
| Empty | 1 | 0 | long | true |
| Empty | 2 | 1 | long | true |
| Empty | 3 | 2 | long | true |
| Empty | abc | 0 | string | false |
| Name | Nathan | 1 | string | false |
| Age | 32 | 2 | string | false |

In the above representation at this point, there is an ambiguity between when an incoming JSON object is a map and has an empty key, and when an incoming JSON object is not a map. In one embodiment, to resolve this ambiguity, a global flag is used to indicate whether the incoming JSON is a map or not. With this flag, the relational representation is as follows:

| Label Path | Value | Index Path | Type | inArray | Map Root |
|---|---|---|---|---|---|
| empty | 12 | 0 | long | false | false |
| empty | abc | 0 | String | false | false |
| empty | 1 | 0 | long | true | false |
| empty | 2 | 1 | long | true | false |
| empty | 3 | 2 | long | true | false |
| empty | abc | 0 | string | false | true |
| name | Nathan | 1 | string | false | true |
| age | 32 | 2 | string | false | true |

Example. Using steps 302-316, for the input example hierarchical JSON object:

```
{
  "name":"Julien Smith",
  "age":23,
  "coordinate":[[12.3, 23.2], [21.2, 23.3], [21.5, 7.3]],
  "online":false,
  "contact":[
    {
      "phone":"555-1234",
      "email":"julien@acme.com"
    },
    {
      "phone":"555-6353"
    },
  ],
  "last updated":"2015-03-21 16:32:22"
}
```

The final conversion to the following relational representation without loss of information is given after run through steps 302-316:

| Label Path | Value | Index Path | Type | In Array | Map Root |
|---|---|---|---|---|---|
| name | Julien Smith | 0 | string | false | true |
| age | 23 | 1 | long | false | true |
| coordinate.0 | 12.3 | 2/0 | double | true/true | true |
|  | 21.2 | 3/0 | double | true/true | true |
|  | 21.5 | 4/0 | double | true/true | true |
| coordinate.1 | 23.2 | 2/1 | double | true/true | true |
|  | 23.3 | 3/1 | double | true/true | true |
|  | 7.3 | 4/1 | double | true/true | true |

-continued

| Label Path | Value | Index Path | Type | In Array | Map Root |
|---|---|---|---|---|---|
| online | false | 5 | boolean | false | true |
| contact.phone | 555-1234 | 6/0 | string | true/false | true |
|  | 555-6353 | 7/0 | string | true/false | true |
| contact.email | julien@acme.com | 6/1 | string | true/false | true |
| last updated | 1426955542000 | 8 | timestamp | false | true |

Each atomic value within the original JSON object is mapped to a relation with 6 values: label path, value, index path, value type, in array flags, map root flag The result of the mapping creates a uniform representation for each value in a complex JSON object. Having this uniform representation enables easy storage and processing of the values in a relational storage and query engine.

Figure 4A:
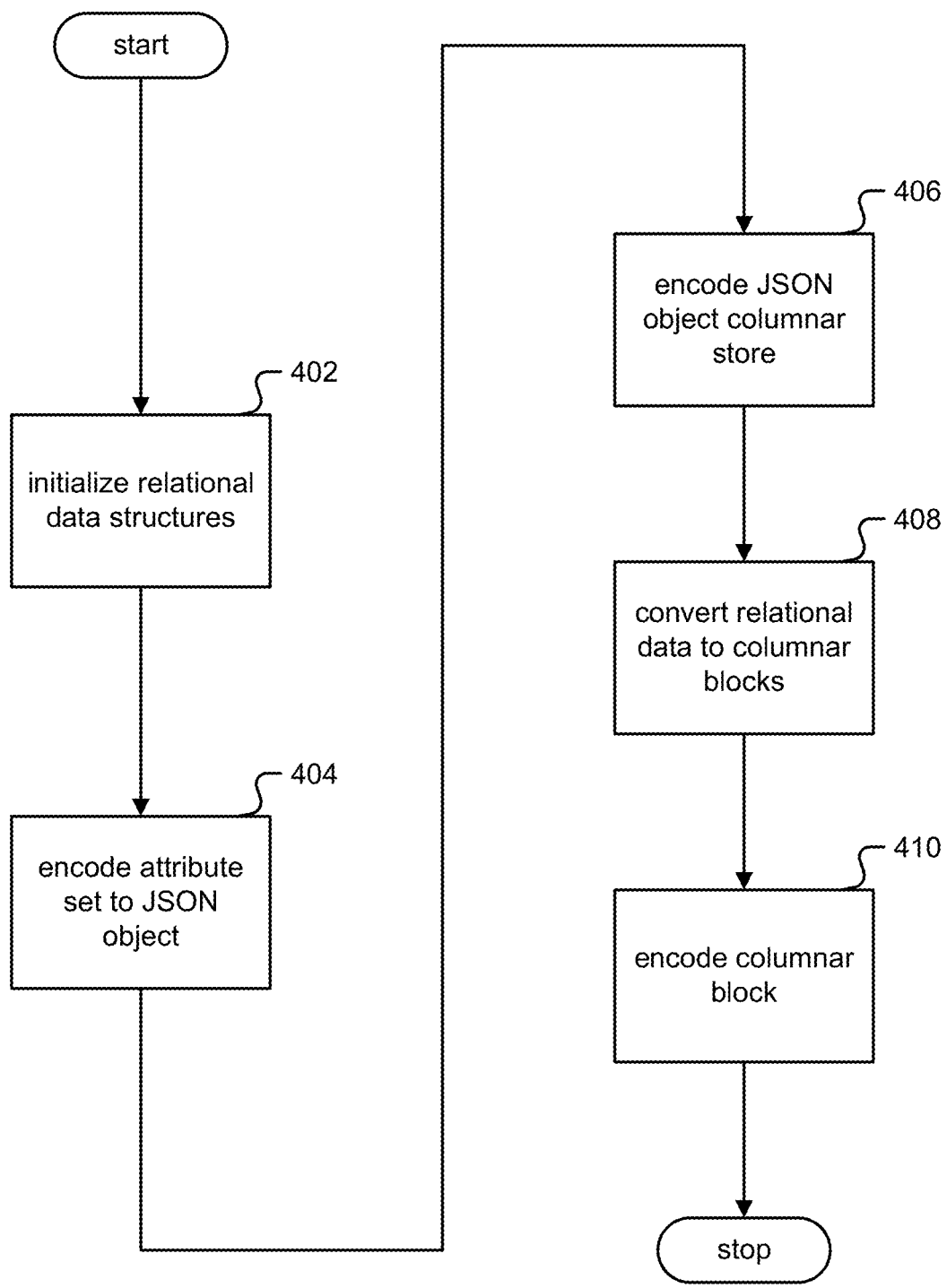
FIG. 4A is a flow chart illustrating an embodiment of a process for encoding a collection of data structures into blocks for each unique label path of the collection.

FIG. 4A is a flow chart illustrating an embodiment of a process for encoding a collection of data structures into blocks for each unique label path of the collection. In one embodiment, the process of FIG. 4A is carried out by one or more subsystems in FIG. 2. The process includes initializing a set of data structures, AttributeSet, Attribute, and AttributeValue, used to hold the relational representation of JSON objects.

In step 402, relational data structures are initialized. FIG. 3 for example described steps in mapping a JSON object to a uniform relational representation. The resulting relational representation encodes each atomic value from the JSON object using a tuple of 6 values: label path, value, index path, value type, in array flags, map root flag In one embodiment, the logic of converting JSON object into such a relational representation is implemented. A data structure called "attribute set" is implemented to encode the tuples from a JSON object in an efficient way. An attribute set is a data structure that may be implemented in Java or other programming languages. To illustrate, attribute set may have the following pseudo syntax:

```
enum ValueType {LONG, DOUBLE, STRING, BOOLEAN, TIMESTAMP}
class Attributevalue {
    int      indexPath[ ];
    ValueType valueType;
    String    displaystring;
    String    stringValue;
    double    doubleValue;
    long      longValue;
}
class Attribute {
    String    labelPath;
    AttributeValue values[ ];
}
class AttributeSet {
    Map<String,Attribute> attributeMap;
}
```

In one embodiment, each JSON object may be represented by an instance of an AttributeSet. An AttributeSet is a Map from label path key to Attribute object. An AttributeSet contains the set of unique label paths as the map keys. Each Attribute object is made of a labelPath string and an array of AttributeValue objects. Each AttributeValue object may contain an index path in the form of an array of integer values, and a ValueType indicating if the value is a long, double, string, boolean, or timestamp. Each AttributeValue may also contain a displayString holding the sequence of character from the original JSON object, and one of stringValue, doubleValue, or longValue. The stringValue, doubleValue, or longValue may contain the parsed value from the original JSON object.

In one embodiment, with the above data structure, encoding may start for the relational tuple with the 6 values: label path, value, index path, value type, in array flags, map root flag as follows:
1. "label path" may be stored inside the Attribute.labelPath, as well as used as a key to the AttributeSet.attributeMap;
2. "value" may be parsed as a typed value and stored inside one of stringValue, longValue, or doubleValue, with parsed type stored inside AttributeValue.valueType. For boolean values, it may be stored as the long value of 1 if true and 0 if false. For timestamp values, it may be stored as a longValue representing milliseconds since epoch (1970-01-01 00:00:00). For timestamp, the original string representation may be also stored inside AttributeValue.displayValue. This is because there may be multiple string representation depending on time zone or string formatting for a timestamp. Hence, preserves the original representation is preserved. For example, if the JSON value is "1970-01-01 00:00:00", then the AttributeValue.displayValue is set to "1970-01-01 00:00:00" and AttributeValue.longValue set to 0, AttributeValue.valueType set to TIMESTAMP;
3. "value type" may be stored inside AttributeValue.valueType; and
4. "index path", "in array flags", and "map root flag" may be stored together inside AttributeValue.indexPath as described below.

In one embodiment, to conserve space, "index path", "in array flags", and "map root flag" are stored together using a single array of integers inside Attribute Value.indexPath.

In one embodiment, the encoding of these values are as follows:
1. The length of the AttributeValue.indexPath integer array is the same as the number of elements in the "index path" if "map root flag" is set to true. If the "map root flag" is set to false, then an extra integer with the value of 1 is pre-pended to form an integer array of size 1 more than the number of levels in "index path". For example, the value entry:

| Label Path | Value | Index Path | Type | In Array | Map Root |
|---|---|---|---|---|---|
| coordinate.0 | 12.3 | 2/0 | double | true/true | True | generates an AttributeValue.indexPath={2, 0}, an integer array with 2 elements. The value entry:

| Label Path | Value | Index Path | Type | In Array | Map Root |
|---|---|---|---|---|---|
| empty | 12 | 0 | long | false | false | generates an AttributeValue.indexPath={1, 0}. The "index path" of 0 is stored in array index 1. The value at array index 0 indicates that the original JSON does not have a Map at the root level;
2. The "index path" is stored as an array of integers inside Attribute Value.indexPath starting at array element 0, if the original JSON is a map at the root level, or at element 1, if the original JSON is not a map at the root level. The integer value from each level of the "index path" is left shift by 1 bit, or multiplied by 2, and stored inside the integer array. For example, if an index path level is 3, then the value 6, which equals 3×2. If an index path integer is 0, then the value used is also 0. If an index path integer is 1, then the value 2 is used;
3. The "in array" flags are stored together with the "index path" by adding 1 to the level value if the in array flag value for that level is true; and
4. Together the pseudo code for gendering the AttributeValue.indexPath is the following:

```
if "map root" is true then
    AttributeValue.indexPath = new int["index path" size]
    j = 0
else
    AttributeValue.indexPath = new int["index path" size + 1]
    AttributeValue.indexPath[0] = 1
    j = 1
end if
for i = 0 , i < "index path" size , i++
    if ("in array" value at i is true) then
        AttributeValue.indexPath[j++] = ("index path" value at i)
            * 2 + 1
    else
        AttributeValue.indexPath[j++] = ("index path" value at i) * 2
    end if
end for
```

Using the examples from FIG. 3, the relational data representation:

| Label Path | Value | Index Path | Type | In Array | Map Root |
|---|---|---|---|---|---|
| name | Julien Smith | 0 | string | False | true |
| age | 23 | 1 | long | False | true |
| coordinate.0 | 12.3 | 2/0 | double | true/true | true |
|  | 21.2 | 3/0 | double | true/true | true |
|  | 21.5 | 4/0 | double | true/true | true |
| coordinate.1 | 23.2 | 2/1 | double | true/true | true |
|  | 23.3 | 3/1 | double | true/true | true |
|  | 7.3 | 4/1 | double | true/true | true |
| online | false | 5 | boolean | False | true |
| contact.phone | 555-1234 | 6/0 | string | true/false | true |
|  | 555-6353 | 7/0 | string | true/false | true |
| contact.email | julien@acme.com | 6/1 | string | true/false | true |
| last updated | 1426955542000 | 8 | timestamp | False | true | may now be encoded to the following AttributeValue data instance:

```
{
    "name":{
        "labelPath":"name",
        "values":[
            {"indexPath":[0], "valueType":"STRING", "stringValue":"Julien Smith"}
        ]
    },
    "age":{
        "labelPath":"age",
        "values":[
            {"indexPath":[2], "valueType":"LONG", "longValue":23}
        ]
    },
    "coordinate.0":{
        "labelPath":"coordinate.0",
        "values":[
            {"indexPath":[5,1], "valueType":"DOUBLE", "doubleValue":12.3},
            {"indexPath":[7,1], "valueType":"DOUBLE", "doubleValue":21.2},
            {"indexPath":[9,1], "valueType":"DOUBLE", "doubleValue":21.5}
        ]
    },
    "coordinate.1":{
        "labelPath":"coordinate.1",
        "values":[
            {"indexPath":[5,3], "valueType":"DOUBLE", "doubleValue":23.2},
            {"indexPath":[7,3], "valueType":"DOUBLE", "doubleValue":23.3},
            {"indexPath":[9,3], "valueType":"DOUBLE", "doubleValue":7.3}
        ]
    },
    "online":{
        "labelPath":"online",
        "values":[
            {"indexPath":[10], "valueType":"BOOLEAN", "longValue":0}
        ]
    },
    "contact.phone":{
        "labelPath":"contact.phone",
        "values" : [
            {"indexPath":[13,0], "valueType":"STRING", "stringValue":"555-1234"},
            {"indexPath":[15,0], "valueType":"STRING", "stringValue":"555-6353"}
        ]
    },
    "contact.email":{
        "labelPath":"contact.email",
        "values":[
```

```
        {"indexPath": [13,2], "valueType":"STRING",
"stringValue":"julien@acme.com"}
            ]
        },
        "last updated":{
            "labelPath":"online",
            "values":[
                {"indexPath":[16], "valueType":"TIMESTAMP",
"longValue":1426955542000, "displayValue":"2015-03-21 16:32:22"}
            ]
        }
}
```

In step 404, the original schemaless object may be reconstructed given its relational data representation stored in an AttributeSet. Reconstructing the schemaless object is done without loss of information. The following may be used to reconstruct the original JSON back without loss of information.

In one embodiment, to reconstruct an original JSON object, first the information is expanded inside an AttributeSet into a tree of nodes. Each node in the tree is either a parent node holding multiple child nodes or a node pointing to a distinct AttributeValue in the AttributeSet.

In one embodiment, a parent node is generated using the levels in AttributeSet.indexPath. A parent node may contain the following information:
- name—derived by splitting the Attribute.labelPath and extracting the label for this node level;
- is array index—indicating if this node is inside a nested array. This information is derived from the labelPath, if the labelPath uses '#' as the separator in front of the name, then the name is artificially generated from a nested array index;
- child index list—a list of child node's index. This is derived out of the AttributeSet.indexPath; and/or
- child node list—a list of pointers to the child node.

In one embodiment, only one unique parent node is created for each unique occurrence of the index path value from the AttributeValue.indexPath since the index value is generated out of the unique items within the original JSON hierarchical structure. A leaf node is a node that points to the actual AttributeValue object.

Figure 4B:
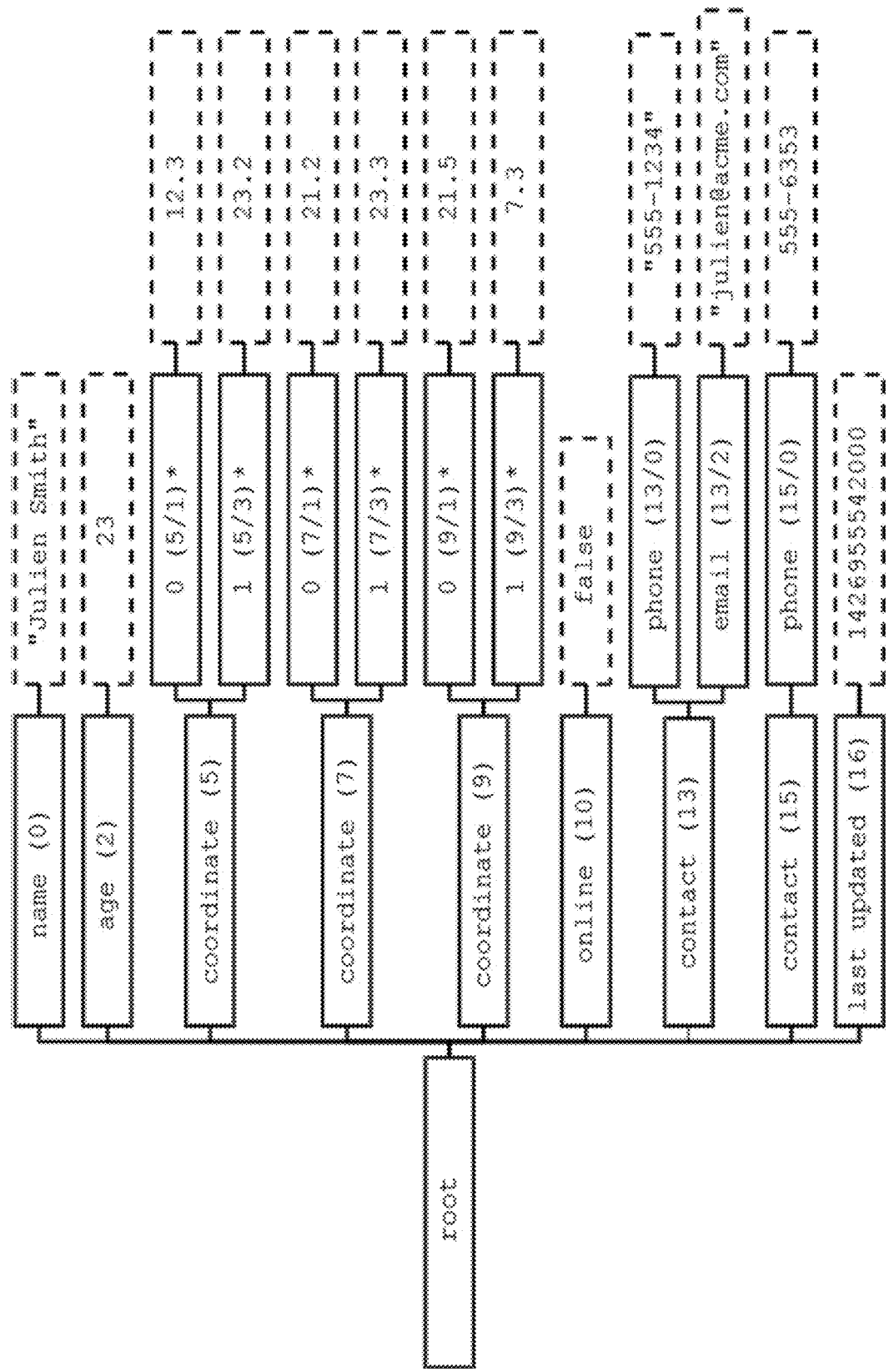
FIG. 4B is an illustration of an example node tree generation.

FIG. 4B is an illustration of an example node tree generation. Using the example from FIG. 3, the leaf nodes are shown as dashed boxes and the parent nodes are shown as solid boxes. For the parent nodes, the name of the node and the AttributeValue.indexPath segment leading to that node is displayed in parenthesis. Parent nodes that have "is array index" set to true are marked with a *.

The node tree of FIG. 4B represents the ordered multi-map representation of the original JSON. It illustrates an embodiment of traversing the node tree and converting consecutive parent nodes with the same name into a single parent node with that name. A new array parent node may be created as the only child node of the single parent node.

In one embodiment, each element of the new array node contains the child nodes of the original parent node at the corresponding position. If there is only one child node from the original parent node and it is a leaf node, then the leaf node is added as an array element. If the child nodes are not leaf nodes, then a new map node is introduced as the array element. The new map node now contains the child nodes of the original parent node.

Figure 4C:
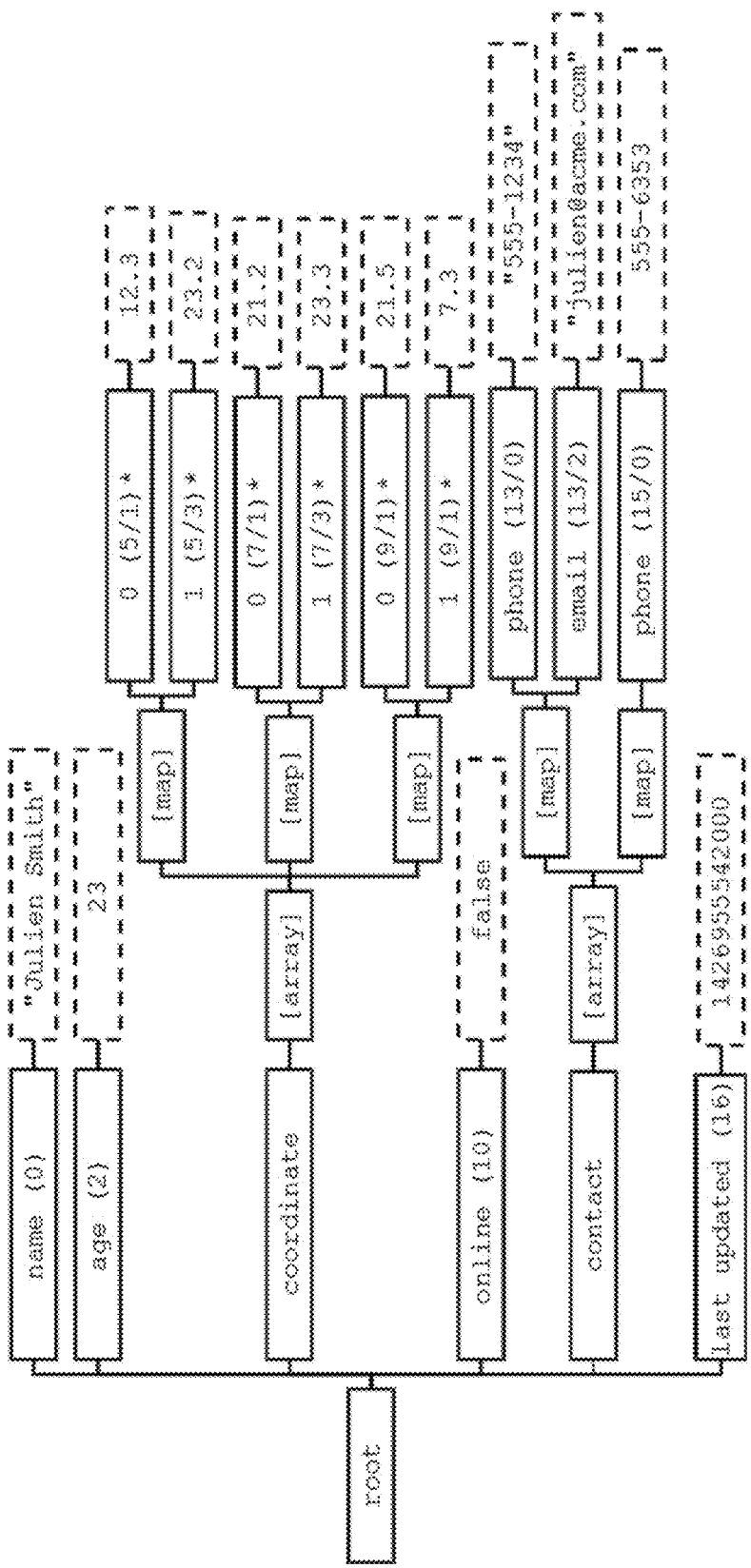
FIG. 4C is an illustration of an example node tree of combining values.

FIG. 4C is an illustration of an example node tree of combining values. Using the example from FIG. 3, values are combined from the same label path to an array of maps. Subsequently, any map nodes whose child nodes having "is array index" set to true may be converted by collapsing the map node and the child nodes into an array node.

Figure 4D:
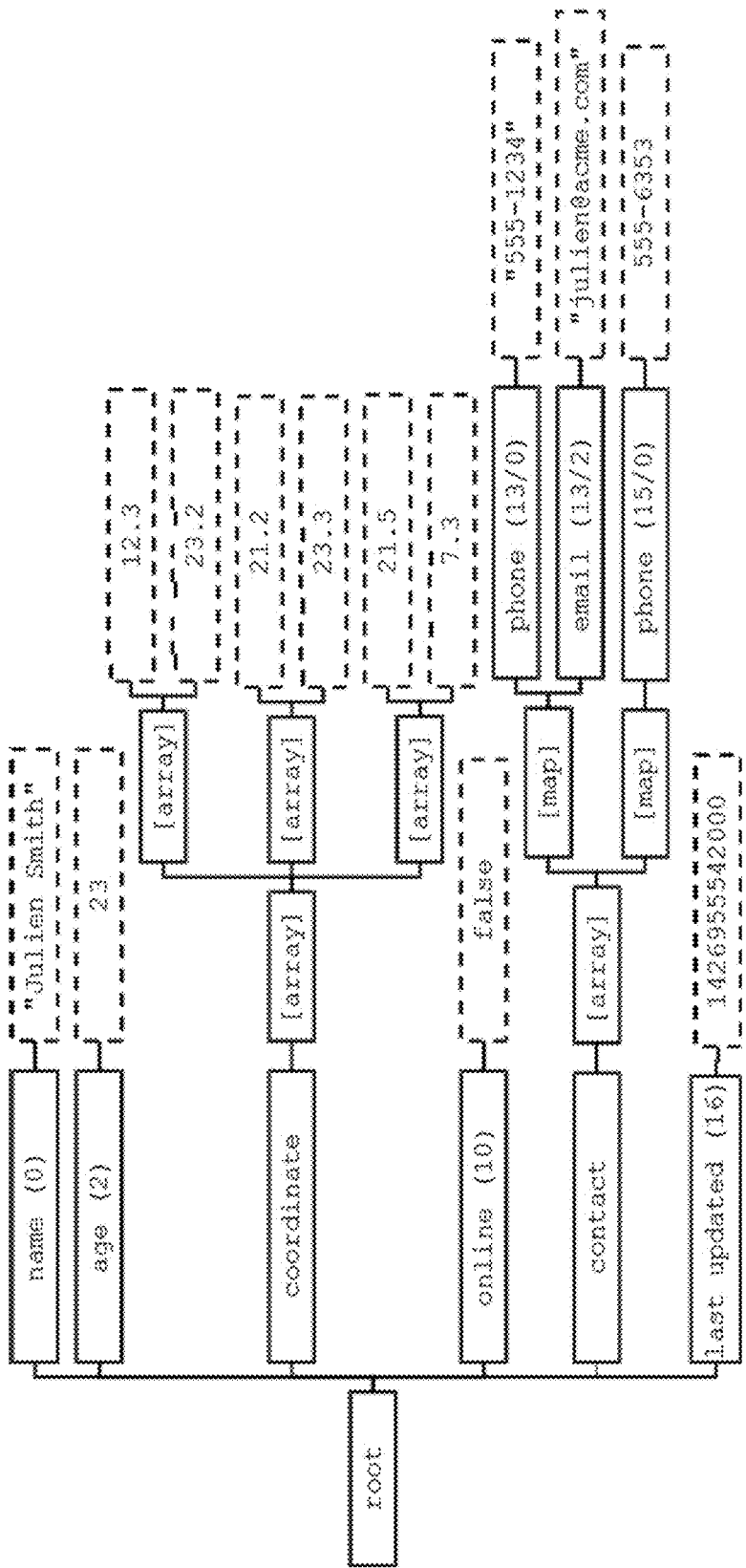
FIG. 4D is an illustration of an example node tree of nested arrays.

FIG. 4D is an illustration of an example node tree of nested arrays. Using the example from FIG. 3, an array index based map key is converted to a nested array. The updated node tree may contain maps and arrays, but no repeated map keys. Hence, the updated node tree may be easily converted into a JSON representation:

```
{
    "name":"Julien Smith",
    "age":23,
    "coordinate":[[12.3, 23.2], [21.2, 23.3], [21.5, 7.3]],
    "online":false,
    "contact":[
        {
            "phone":"555-1234" ,
            "email":"julien@acme.com"
        },
        {
            "phone":"555-6353"
        },
    ],
    "last updated":"2015-03-21 16:32:22"
}
```

Non-Map Root. In one embodiment, when an AttributeSet represents a JSON object that is not a map at the root level, the indexPath contains 1 more element compared to the number of levels in the label path. In this case, the first element of the index path may be ignored when constructing the root tree.

For example, the original JSON object: [1,2,3] is converted to the AttributeSet:

```
{
    "":{
        "labelPath":"",
        "values":[
            {"indexPath":[1,1],"valueType":"LONG", "longValue":1},
            {"indexPath":[1,3],"valueType":"LONG", "longValue":2},
            {"indexPath":[1,5],"valueType":"LONG", "longValue":3},
        ]
    }
}
```

In one embodiment, the above attribute set may generate a node tree by ignoring the first value in the index path.

Figure 4E:
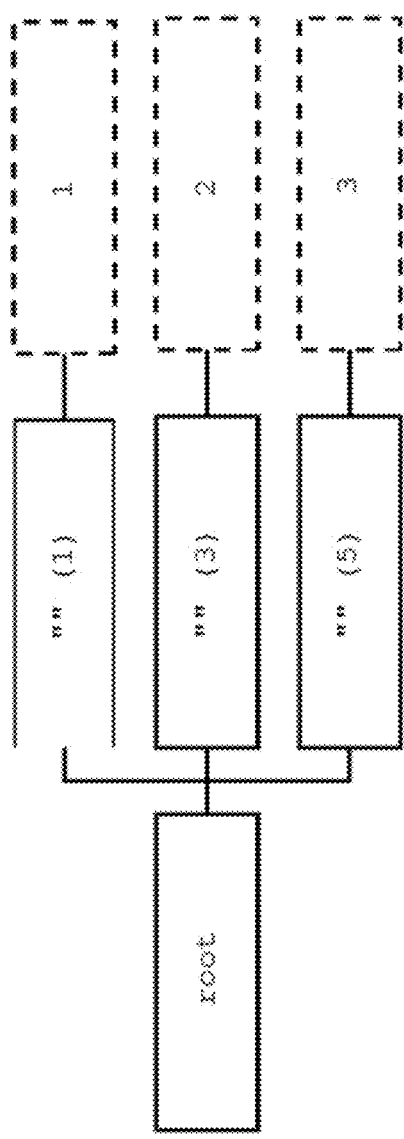
FIG. 4E is an illustration of an array for a non-map root tree.
Figure 4F:
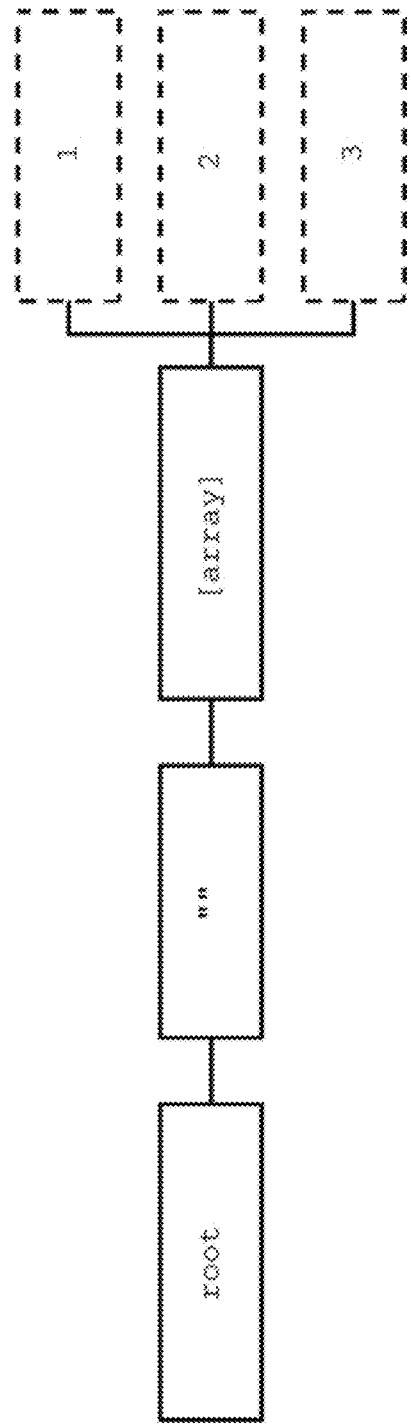
FIG. 4F is an illustration of a converted array for a non-map root tree.

FIG. 4E is an illustration of an array for a non-map root tree. For the above example, the node tree is then converted to collapse the repeated node names and array nodes. FIG. 4F is an illustration of a converted array for a non-map root tree. The modified node tree derives the JSON object:

```
{
    "" : [1,2,3]
}
```

As the index path indicates that the root is not a map, the sole map element may be extracted from the above JSON root to return only the JSON array: [1, 2, 3].

Atomic Value Versus Array of One Value. In one embodiment, a special case of the atomic value versus an array of one value may be illustrated by the following example. The values for the keys "0", and "3" are simple integers, but the value for key "1" is an array of 1 integer:

```
{
    "data" : {
        a"a" : 1,
        "b" : [2] ,
        "c" : 3
    }
}
```

The AttributeSet representation of the above JSON object is:

```
{
    "data.a":{
        "labelPath":"data.a",
        "values":[{"indexPath":[0,0],"valueType":"LONG",
        "longValue":1}]
    },
    "data.b":{
        "labelPath":"data.b",
        "values":[{"indexPath":[0,3], "valueType":"LONG",
        "longValue":2}]
    },
    "data.c":{
        "labelPath":"data.c",
        "values":[{"indexPath":[0,4], "valueType":"LONG",
        "longValue":3}]
    }
}
```

Figure 4G:
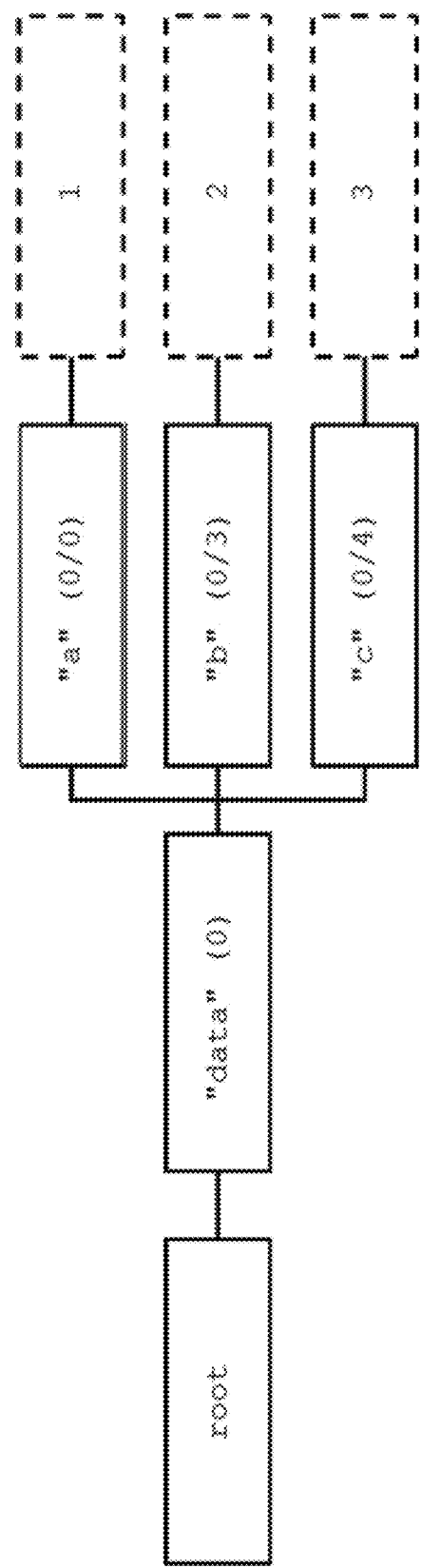
FIG. 4G is an illustration of an array of one value node tree.

FIG. 4G is an illustration of an array of one value node tree. In one embodiment, the lowest value of the index path of the parent node leading to the leaf node is checked. If the lowest index path value is an odd number, then the leaf node value is wrapped inside an array. If the lowest index path value is an event number, then the leaf node value is added as is.

The index path value for the map key "a" and "c" are both even numbers: 0, 4. Hence, the values are added as is. The index path value for the map key "b" is an odd number, 3, resulting in the value being added inside an array:

```
{
    "data":{
        "a":1,
        "b":[2],
        "c":3
    }
}
```

Continuing on step 406 of FIG. 4A, a columnar store is encoded, for example with a label splitter/block generator (208). Schemaless objects, for example JSON objects, are usually created to represent many instances of a type of data. For example, there may be millions of event schemaless/JSON objects from a temperature sensor, tens of thousands of schemaless/JSON objects for customer information, and thousands of transaction order information schemaless/JSON objects. The structure of the data in a collection may vary over time. JSON is flexible to adapt to this structure change since no pre-declared schema is required for any JSON object.

There is the need to store the schemaless/JSON objects persistently. The stored schemaless/JSON objects may be associated with their respective collection. There is also the need to retrieve schemaless/JSON objects using the collection name as the reference such as "get customer who lives in San Francisco", "get orders with purchase amount greater than $20".

There are multiple methods in storing JSON objects such as serializing the objects to disk as strings or storing them as a binary blob in a database. In one embodiment, a method of storing JSON objects is created by first converting JSON objects into relational representation in the form of AttributeSet objects. Each unique label path in the AttributeSet is treated as a column. The values for the same column are stored together in columnar based storage.

Figure 4H:
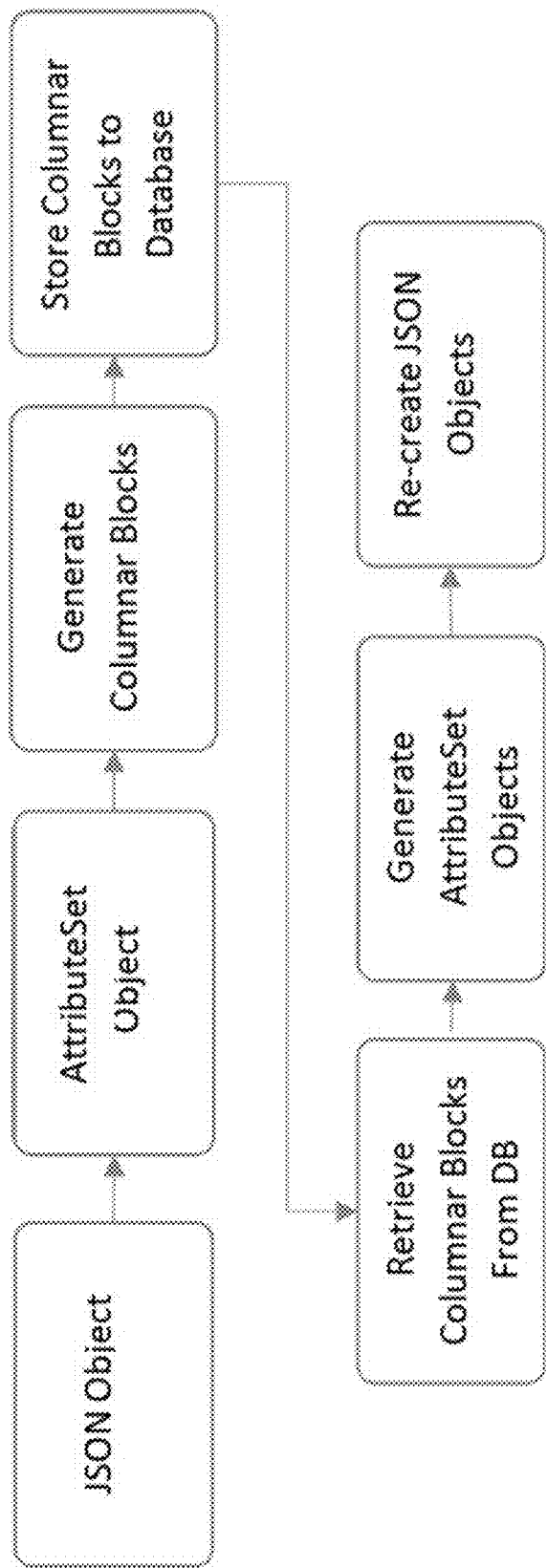
FIG. 4H is an illustration of a workflow for storing and retrieving JSON data using columnar blocks.

In one embodiment, to retrieve persisted data, the caller may fetch one, multiple, or all columns. The fetched data is then reconstructed into an AttributeSet object, which may then be mapped back to a JSON object. Given the data is stored by columns, the process allows a subset of the original JSON object to be efficiently retrieved by simply fetching only the corresponding column data containing that subset. FIG. 4H is an illustration of a workflow for storing and retrieving JSON data using columnar blocks. Thus, there is an ability to reconstruct a subset of the original JSON.

Continuing on step 408 of FIG. 4A, relational data representation is stored in columnar structure, for example with a label splitter/block generator (208). In one embodiment, to store relational data representation in columnar structure, the relational data is first divided into finer structures called columnar blocks.

To illustrate, example data for sensors are given as:

| datetime | light | temperature | humidity | moteid | voltage |
| --- | --- | --- | --- | --- | --- |
| 2004 Feb. 28 01:06:46.778 | 11.04 | 122.153 | −3.91901 | 1 | 2.03397 |
| 2004 Feb. 28 00:59:16.027 | 45.08 | 19.9884 | 37.0993 | 1 | 2.69964 |
| 2004 Mar. 31 03:38:15.757 | 45.08 | 19.3024 | 38.4629 | 1 | 2.68742 |
| 2004 Apr. 01 09:51:18.378 | 43.24 | 19.1456 | 38.8039 | 3 | 2.69964 |
| 2004 Apr. 01 09:56:20.478 | 43.24 | 19.1456 | 38.7357 | 3 | 2.69964 |
| ... | ... | ... | ... | ... | ... |

That is, a collection of relational data may be represented wherein each row is a single data point and all the rows together forms the collection. The relational data may be viewed as a single large matrix. The process of block generation divides this single matrix into smaller matrices containing adjacent rows and columns. In one embodiment, the table is first partitioned by rows. The partitioning may be done in two ways. If the data has a natural ordering such as time series data points, then it may be partitioned by the natural ordering column. In the above example, a partitioning may be performed using the datetime column placing all adjacent values with the same date together to form a partition. If the data does not have any natural ordering, then the partitioning may be done by grouping every N adjacent rows together to form a partition. In one embodiment, a next step is to split the data by columns. FIG. 4I provides an example where the result of row and column splits produces 18 data blocks.

In order to correlate different block data together to recreate the original row, each row is also assigned a monotonically increasing global unique identifier. The same unique identifier is attached to each column value to the same row in various columnar blocks such that at retrieval time, the different column values may be reconstructed back into the same row.

In this example, each columnar block is shown to have a column label with 1 or more simple values. This is a simplified view of the block data. In one embodiment, the data for a row-column cell is an AttributeValue object. Each AttributeValue object is made of multiple data fields. Some AttributeSet objects may not have any values of a label path. Hence, the columnar block may need to be able to encode NULL values. Each columnar chuck may also be able to store values of different types since there is no declared schema and the values of a label path need not be the same type.

5. A block may be stored inside a key-value persistent store (214) such as Apache Cassandra or Hadoop HBASE. This allows relational data to be efficiently stored inside a key-value based non-relational storage; and/or 6. At data retrieval time, the ordering within the blocks allow an efficient single pass method to merge AttributeValues from different label path stored in separate blocks together to form the AttributeSet object.

In step 410, columnar blocks may be encoded, for example with a label splitter/block generator (208). In one embodiment, each columnar block efficiently stores the following information: object id, indexPath, longValue, doubleValue, stringValue, valueType, and is NULL flag. There are multiple items in a block. The values for each type of data from all the items in a block are stored together. In one embodiment, various pieces of information are encoded using bit flags, run-length encoding, and other mechanisms to reduce the amount of storage used. Inside a columnar block, the following data fields may be used to store the block information:

| Field | Type | Example |
| --- | --- | --- |
| version | unsigned int | 1 |
| size | unsigned int | 5 |
| rowInfoVector | bit flags | 1010101100000111 |
| valueInfoVector | bit flags | 0 |
| notEmptyVectorFlags | bit flags | 00011 |
| stringVector | string list | [ ] |
| longVector | long list | [ ] |
| doubleVector | double list | [1.92207, 1.92831] |
| valueTypeVector | unsigned int list | [0, 2] |
| valueSizeVector | unsigned int list | [ ] |
| versionVector | unsigned int list | [ ] |
| pathVector | unsigned int list list | [[12]] |

In one embodiment, each JSON object is allowed to have a different structure in the same collection/schema change. In one embodiment, the complete data within a columnar block is then made of the label path as the column name. Then there are 1 to N items within this block. Each item is made of a unique Object ID, AttributeValue.indexPath, AttributeValue.longValue, AttributeValue.doubleValue, AttributeValue.stringValue, AttributeValue.valueType, and a flag indicating if the value is NULL or not. The same Object ID may appear multiple times within a block because the label path is not unique with respect to the values inside an AttributeSet. The items in a block are also ordered by the Object ID, then by label path. The same ordering may be used in all blocks. Thus, the AttributeValue objects may store values of different types for a label path.

For example a same "custom" label may have long, double and string values for different objects. For the same label path, heterogeneous value types may be represented using a structure similar to example shown in FIG. 4J.

This data block representation may have several benefits:
1. Data within each block may be efficiently compressed;
2. Writing multiple data values in the same block requires a single operation, which results in reduced I/O and speeds up the writes;
3. Retrieving data from a subset of columns in the collection does not require reading data from other columns;
4. If row partitioning is based on natural ordering of some column value, retrieving data within a value range from that natural ordering does not require fetching data from all rows;

wherein, in one embodiment:
version—the version of block encoding. Currently set to 1, future enhancements to block encoding may increment this value;
size—the number of rows inside this block. Note that the actual number of values in a block is greater than or equal to the number of rows since some rows may have multiple values;
rowInfoVector—variable sized bit flags specifying the nature of each row in this block. See detailed explanation below;
valueInfoVector—variable sized bit flags specifying value information for rows with multiple values. See detailed explanation below;
notEmptyVectorFlags—variable sized bit flags indicating which of the stringVector, longVector, doubleVector, valueTypeVector, valueSizeVector, versionVector, pathVector has data. If the bit flag is true, then the corresponding vector contains data. If the bit flag is false, then there are no data for the corresponding vector. When a vector has no data, it takes no space on disk because the vector is skipped during the read and write;
stringVector—a variable sized list of string from AttributeValue.stringValue. It is encoded with an unsigned length integer, followed by 1 or more UTF8 encoded string. Each string is encoded with a length integer and then zero or more bytes of the UTF8 string;
longVector—a variable sized list of long values from AttributeValue.longValue. It is encoded with unsigned length integer, followed by 1 or more 8-byte long using BigEndian encoding;

doubleVector—a variable sized list of double values from AttributeValue.doubleValue. It is encoded with unsigned length integer, followed by 1 or more 8-byte double in IEEE encoding;

valueTypeVector—a variable sized list of unsigned integer. Used to record the changes in value type for values explicitly recorded in the block;

valueSizeVector—a variable sized list of unsigned integer. If a row contains multiple values, then the row's corresponding value in this vector indicates how many values are for the row;

versionVector—reserved for future use to encode versioned values; and/or pathVector—a variable sized list of list of unsigned integer. This is encoded using an unsigned integer size, followed by 1 or more list of unsigned integer. Each list of unsigned integer is made of an unsigned integer size, followed by 1 or more unsigned integer values. The path vector stores the path information for each item value.

Thus, the use of valueTypeVector and valueSizeVector may keep track of value type changes within a block. Many other methods may be used to reduce the amount of space used for block storage. For example, storing null values as bit flags. Another example is for an item with the same type and value as the previous item, the item may also be stored just using bit flags. Another example is that consecutive values that are the same may be stored only once. For example, suppose there are the following row values to be stored in a block:

| Object ID | indexPath | longValue | doubleValue | stringValue | valueType | Is NULL |
|---|---|---|---|---|---|---|
| 1 | 0 | 12 | | | LONG | False |
| 1 | 2/1 | 12 | | | LONG | False |
| 2 | 6 | 12 | | | LONG | False |
| 3 | 6 | 10 | | | LONG | False |
| ... | ... | ... | ... | ... | ... | ... |

Inside the block, the longVector may then be used to store the sequence of values: 12, 12, 12, 10, and so forth. The valueTypeVector may be used to store the value type sequence: LONG, LONG, LONG, LONG, and so forth. To reduce the amount of storage, the longVector inside the block contains only 12, 10, and so forth. The valueTypeVector contains only (0, LONG), and so forth. The values that are the same as previous are encoded as bit flags inside rowInfoVector and valueInfoVector.

In one embodiment, the rowInfoVector is the entry point when using a columnar block. There are a set of bit flags for each row inside the block in the rowInfoVector, as a table of columnar block rowInfoVector bit flags:

| Bit 1 | Bit 2 | Bit 3 | Bit 4 | Bits Used | Scenario |
|---|---|---|---|---|---|
| 0 | 0 | N/A | N/A | 2 | NULL value |
| 0 | 1 | 1 - same as last version 0 - different version | 1 - same as last path 0 - different path | 4 | Single value, same value as previous |
| 1 | 0 | 1 - same as last version 0 - different version | 1 - same as last path 0 - different path | 4 | Single value, different from previous |
| 1 | 1 | 1 - same value list size | | 3 | Multiple values, see extended |

| Bit 1 | Bit 2 | Bit 3 | Bit 4 | Bits Used | Scenario |
|---|---|---|---|---|---|
| | | | 0 - different value size | | information |

For example, if the bit flags for rowInfoVector are: 1 0 1 0 1 0 1 1 0 0 0 0 0 1 1 1, then:

| Bits | Row | Explanation |
|---|---|---|
| 1010 | Row 0 | Single value, different from previous, same version, different path |
| 1011 | Row 1 | Single value, different from previous, same version, same path |
| 00 | Row 2 | Null |
| 00 | Row 3 | Null |
| 0111 | Row 4 | Single value, same as previous, same version, same path |

In one embodiment, two bit flags rowInfo Vector may be used to store information if a row contains a single value or multiple values. In one embodiment, if the row contains a single value:

If the value is NULL, set 00 as the bit flags;

If the value is the same as the previous value, set the bit flags to be 01. Note that even the very first row value may be flagged the same as previous value because the default value is a NULL String. If the single value is not the same as previous, then set bit flags to be 10, and then store the value and the value type;

The value type is recorded if it is different from the previously recorded value type using the valueTypeVector. Each change in value type is recorded using a pair of unsigned integers. The first integer records the value index at which the change happens. Note that this value index is the number of values actually recorded in the block, not the logical value index. For example, when recording 12, 12, 12, 12, only the first 12 is actually recorded even though there are 4 logical values. The second integer records the type of value at that index. In the example, the type if a LONG. Each type has a unique integer value:

a. LONG—1
b. DOUBLE—2
c. STRING—3
d. TIMESTAMP—6
e. BOOLEAN—7
f. There may be additional types;

When a value is different from the previous value, the value is stored inside one of longVector, doubleVector of stringValue depending on the type of value; and/or In addition to recording the value, the path information for the value may also be recorded. Similar to value recording, a path value is added to the pathVector only if the path is different from the last value's path. The default path is [0]. If the path is different, then the bit flag for the path is set to true inside the rowInfoVector and the path value is added to the pathVector. If the path is the same, then the bit flag is set to false inside the rowInfoVector.

In one embodiment, if the row has multiple values, then:

A first determination is if the number of values is different from the number of values from the last multi-valued row. The default number of values for a multi-valued row is 2. If the number of values is different set the 3rd bit flag in rowInfoVector to true and the record value size in valueSizeVector. Otherwise, set the 3rd bit flag in rowInfoVector to false;

A next step is, for each value in the multi-valued row, using 3 bit flags in valueInfoVector to record the following:

| Bit 1 | Bit 2 | Bit 3 |
|---|---|---|
| 1 - value is the same type and value as the last value<br>0 - value is different from last value | 1 - value is the same version as last value<br>0 - value is different version | 1 - value has the same path as the last value<br>0 - value has different path as the last value |

If the value is the same as previous value, set first bit flag to 0. If it is different from the previous value, then set first bit flag to 1, then store the value and value type the same way as described in the handling of single value; and/or Similarly, if the version or path is the same as the previous, then set their corresponding bit flag to 1. If not, then set the flag to 0 and record the version and path using the same process as the handling of version and path for single value.

In one embodiment, the object id is not recorded inside a block. To store a sequence of rows, the rows are sorted by their object ID first. Then each columnar block stores the column values in the same sequence with respect to the object ID. As a result, the Nth item from each columnar block may belong to the Nth row. Not storing the object id inside each columnar block may reduce the amount of space used.

In one embodiment, if all column values inside a columnar block are NULL, then the entire columnar block may be omitted. This also reduces the amount of space used to store data, as well as allowing additional columns to be introduced without needing to introduce NULL valued blocks for rows that already exists.

Figure 5A:
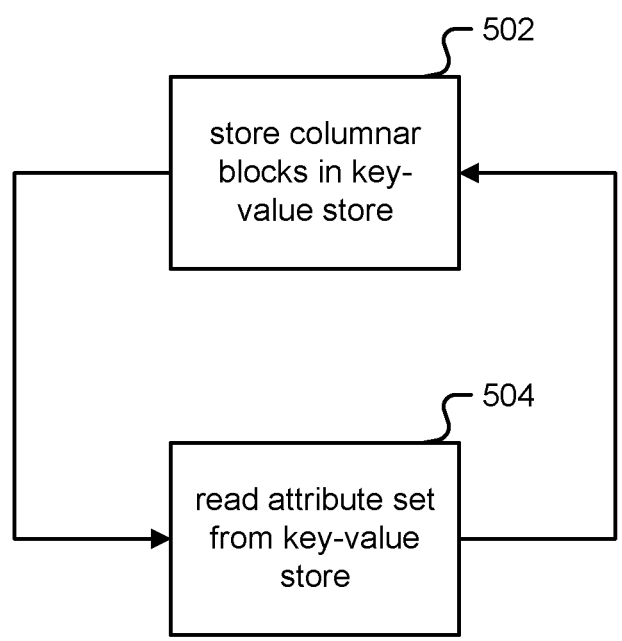
FIG. 5A is a block diagram illustrating an embodiment for a process for storing columnar blocks.

Balanced Key Ranged Based Retrieval of Key-Value Store. FIG. 5A is a block diagram illustrating an embodiment for a process for storing columnar blocks. In one embodiment, the process of FIG. 5A is carried out by one or more subsystems in FIG. 2, for example subsystems (208), (210), and (212).

In one embodiment, the AttributeSet objects encoded in columnar blocks may be efficiently stored in a persistent storage (214) such as on files, in a relational database, or in a distributed key-value store. The process of storing columnar blocks in a distributed key-value store (214) is disclosed.

In one embodiment, a distributed key-value store (214), such as Hadoop HBASE or Apache Cassandra, stores data in a two level map. The first level map provides a key to a value. This value is another ordered map. The system is setup as a cluster of data nodes. The first level map is also used to distribute data across many data nodes in the cluster. This type of persistent storage (214) provides efficient and high performance distributed data partitioning and replication for very large amounts of data. However, key-value based systems cannot represent complex data structures easily. Typically, a user may manually create a physical key-value centric schema design and then write custom programs to break up complex data structures to be stored in a key-value store (214). However, with JSON columnar blocks, the benefits of a distributed key-value store is leveraged and provides the abilities to insert and retrieve complex JSON data structures.

In step 502, columnar blocks are stored in a key-value store (214), for example with a key assigner (210) and/or key-value storer (212). As described along above with FIGS. 3 and 4A-4G, an automated process converts highly complex data represented as a JSON object into a granular relational representation as AttributeSet objects. A collection of AttributeSet objects is mapped into a set of columnar blocks. The columnar blocks may be inserted into a distributed key-value store (214) efficiently without manual intervention.

As shown in FIG. 5B, columnar blocks for a collection of JSON objects may be illustrated as a table with a set of columnar blocks for a collection of AttributeSet objects:

In one embodiment, there are many columnar blocks. Each block contains information for a single label path generated out of the original JSON objects. Each block contains one or more values from several adjacent JSON objects that are next to each other based on an ordering criteria. The ordering criteria may be an object timestamp or other factors. Each block encodes the information stored as a blob of bytes representing internal structures such as rowInfoVector, valueInfoVector, etc. Object IDs are not stored inside any of the blocks.

The blocks may then be viewed as a matrix of blob bytes:

| Object ID | name | age | contact.phone | contact.email |
|---|---|---|---|---|
| 1, 2, 3 | bytes | bytes | bytes | bytes |
| 4 | bytes | bytes | bytes | bytes |
| 5, 6 | bytes | bytes | bytes | bytes |

In one embodiment, each column of the matrix is uniquely identified by its label path. Each row of the matrix may be uniquely identified by the minimum object ID for the objects stored in that row. To store this matrix in a 2-level key-value store (214), the top level partitioning key is first determined. The partitioning key is used to create data sharding and replication in the storage system. It may also be very efficient when removing data within a partition.

In one embodiment, the partition key is made of following three main elements:

partitioning token—an application generated random partitioning token. This random token may assist in distributing data in the same collection and same ordering chunk into multiple partitions to create load balanced storage. For example, if all data within a collection falls into the same ordering chunk, then without a partitioning token, all data may be placed in the same partition. This partitioning token is generally small, representing a balance between ease of use and data distribution. In one embodiment, a 2-byte value is used for partitioning token allowing a maximum of 65,535 partitions. The token is random but deterministic in some cases. For example, when the JSON object being stored has primary identifiers, then the token is a random hash on the primary identifier of the JSON object. The token may also be a combination of hash from the primary identifier and the hash of collection name. This way, one may find the existing JSON object with that identifier. If the object has no identifier such as an event object, a measurement data point, then the token may be a random value. One may not create a partitioning token that is dependent on columnar data. A partitioning token may be the same for all columnar blocks of the same objects;

name of collection and label path—name of the collection and label path. This allows multiple collections to be stored in the same key-value table in a persistent storage (214), and at the same time, it separates out the data for each label path. Data for the same label path within a collection are stored near each other for faster retrieval, when the key-value store (214) uses an ordered partition algorithm. Both Apache Cassandra and Hadoop HBASE support ordered partitioning when storing data; and/or ordering chunk—this is typically a time chunk based on the object's timestamp. A time chunk is a coarse representation of the timestamp. For example, the time chunk may be every 10 minutes, every day, or every month. The ordering chunk separates the data in a collection into time series within a partitioning token for that collection. This facilitates fast retrieval of a subset of the data by time range. Another benefit is that data may be easily deleted or older data archived without affecting or rearranging newer data in the storage. While timestamp is often used as the ordering chunk, any ordering chunk may be used. For example, data may be ordered by age and allow creation of age chunks: 0-10, 11-20, etc. Similar to a partitioning token, an ordering chunk is dependent only on the information that is global to a data object. Hence all blocks of the same data objects have the same ordering chunk.

In one embodiment, with the partitioning key method, a portioning key is generated for each block. This is illustrated using an example in a table of columnar block partitioning keys:

| Object ID | name | age | contact.phone | contact.email |
|---|---|---|---|---|
| 1, 2, 3 | A.user.name.0 | A.user.age.0 | A.user.contact.phone.0 | A.user.contact.email.0 |
| 4 | A.user.name.0 | A.user.age.0 | A.user.contact.phone.0 | A.user.contact.email.0 |
| 5, 6 | B.user.name.0 | B.user.age.0 | B.user.contact.phone.0 | B.user.contact.phone.0 |

The nomenclature of "A.user.age.0" is used wherein A is the partitioning token, user is the name of the collection. age is the label path, 0 is the ordering chunk. In one embodiment, with the partitioning key, one or more blocks are assigned into the same partitioning key. These blocks are then stored in the second level ordered key-value map using a block key, which may also be called a column key, or a clustering key because this key orders the data within a partition. In one embodiment, a block key is constructed using the value from the first object stored in the block as follows:

order remainder—Since the more significant portion of the ordering value, or coarse representation, is already placed in the partitioning key, the remaining less significant portion of the ordering value is added as the first part of the block key. Frequently, the ordering value is a timestamp. If partitioning key separates the data by day, then the remainder is the hours, minutes, and seconds within the day. If the partitioning key separates the data every 10 minutes, then the remainder is the seconds within the 10-minute window. Having an order remainder on the block key leverages the key-value store's ability to order the data by the remainder. This allows for data to be fetched easily either by time ascending or time descending; and/or object id—Since the order remainder need not be unique across blocks, for example all blocks are for the same timestamp, the object id from the first object is appended to the "object remainder" and used as a unique identifier for this block.

In one embodiment, as shown in FIG. 5C, the partitioning key is the key to the first level map and the block key is the key to the 2nd level map within the first level map, using a two-level map view of columnar blocks.

As shown in FIG. 5C, the partition keys separate the 12 columnar blocks into 8 partitions. The 8 partitions may potentially be on separate machines in a clustered key-value setup. Each columnar block has a block key. The related columnar blocks for the same data row have the same block key.

In one embodiment, when the columnar blocks are stored in a distributed key-value store (214), the key-value store may easily spread out the columnar blocks to many data nodes using the partitioning key value for the columnar block.

Figure 5D:
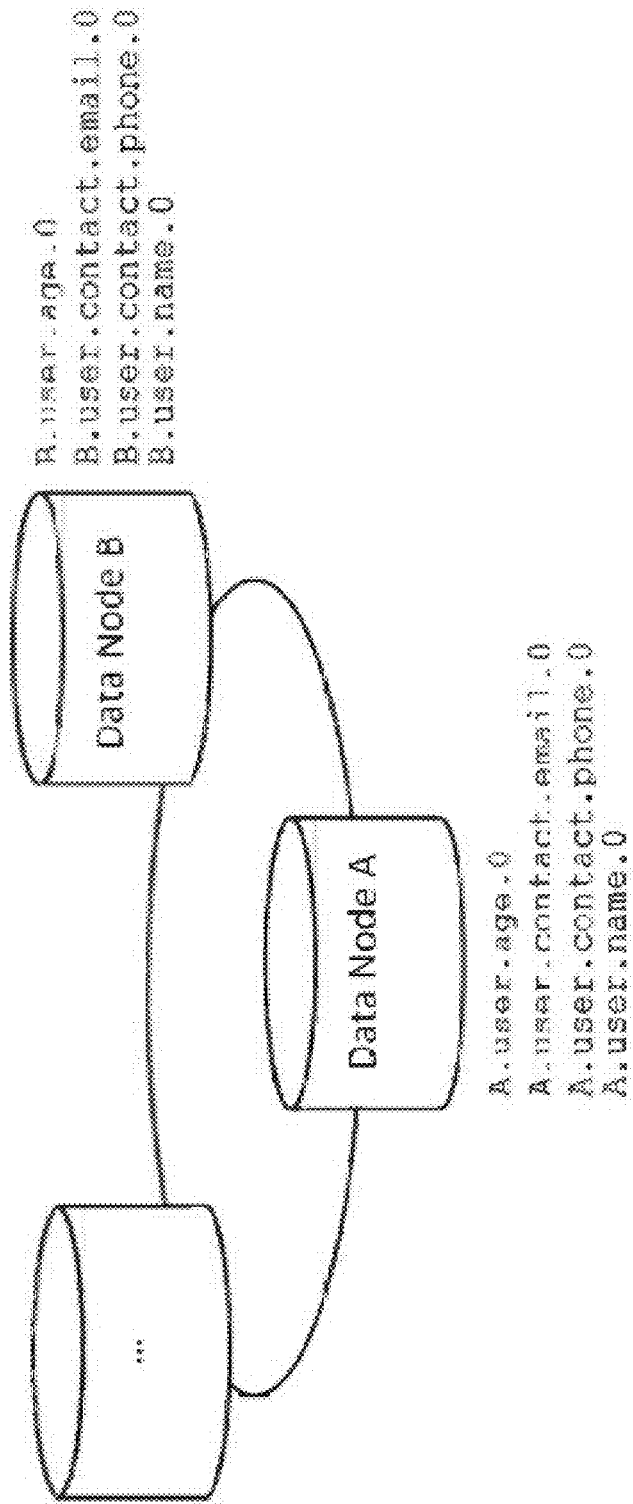
FIG. 5D is an illustration of a distributed store of columnar blocks.

FIG. 5D is an illustration of a distributed store of columnar blocks. The ability to spread out the columnar blocks across many data nodes may grant the ability to horizontally scale the system to handle an enormous amount of JSON data. More data nodes increase the total amount of data that may be stored. Data may be written to and read from the key-value store (214) faster as multiple data nodes may work concurrently to store the data.

In step 504, an AttributeSet may be read from the key-value store (214), for example with a block retriever (228). In one embodiment, AttributeSet objects may be easily read out and reconstructed from the columnar blocks stored in key-value store. Since data is stored per label path, the caller may also efficiently retrieve just a subset of the original data.

In one embodiment, integration with a SQL based query engine such as Apache Drill or Apache Spark is included as shown in FIG. 2. In this integration, the system acts as a storage component supplying data to the query engine upon requests. The query engine (220) is responsible for interpreting user provided SQL query and generate a request for data from the storage component. In one embodiment, a request for data typically contains the following parameters:

List of columns to retrieve;

Name of the collection to fetch the data from; and/or

Optional list of predicate expressions to constraint the data to return.

In one embodiment, because the data is stored in columnar blocks a number of optimization strategies may be performed to satisfy the request for data. First, a set of label paths based on the list of columns is generated to retrieve from the data request. Since JSON data is hierarchical and each unique label path is stored separately in its own columnar blocks, a request for a column may be expanded into all descendent label paths with that column as the prefix. Thus an ability to optimize query execution by push down projection of columns is shown, wherein push down projection of columns means fetching a subset of columns.

For example, suppose the data request asks for the name and contact from the customer collection. The data is stored in columnar blocks with the following set of unique label paths:

name age
coordinate.0
coordinate.1
online
contact.phone
contact.email
last updated In one embodiment, results may be fetched from the label paths: name, contact.phone, and contact.email. A key-value store lookup request may be generated for each label path. Data for a label paths are stored in many columnar blocks are spread out to various partitions in the key-value store. To fetch data for a label path from the key-value store, N lookup requests are created; one for each partitioning token.

In one embodiment, when the predicate expression contains range constraints against the ordering value of the collection, a minimum ordering chunk value and a maximum ordering chunk value are created based on the constraints. The minimum and maximum ordering chunk values are attached as a partitioning key constraints to each key-value lookup request.

The general format of the resulting key-value lookup request may appear as:

```
GET columnar blocks
FROM key-value store
WITH
    partitioning key >=
    [partitioning_token.collection.label.ordering_min_chunk]
    AND
    partitioning key <=
    [partitioning_token.collection.label.ordering_max_chunk]
```

Figure 5E:
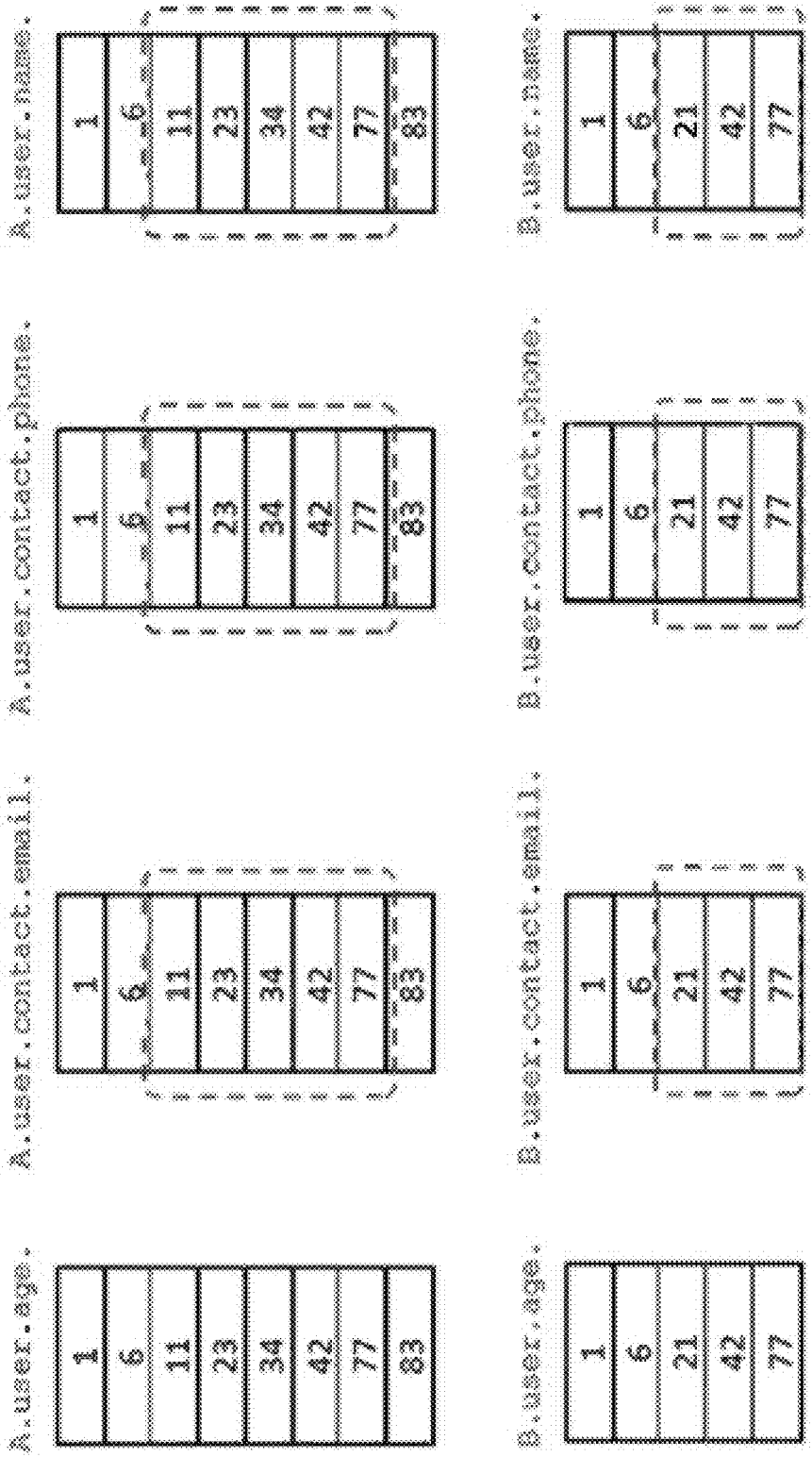
FIG. 5E is an illustration of an example of columnar block subset retrieval.

Thus, an ability to optimize query execution by push down predicate of time dimensions is shown. A push down predicate means a key range based filtering as shown in FIG. 5E below, wherein time dimension is part of the ordering chunk.

In one embodiment, if there are no constraints against the ordering value, then the minimum possible ordering value (0x0) and the maximum possible ordering chunk value (0xFFFFFFFF) is used.

For example, to retrieve name and contact, the following six key-value lookup requests are used:

```
GET columnar blocks FROM key-value store
WITH
    partitioning key >= A.user.name.0 AND
    partitioning key <= A.user.name.FFFFFFFF
GET columnar blocks FROM key-value store
WITH
    partitioning key >= B.user.name.0 AND
    partitioning key <= B.user.name.FFFFFFFF
GET columnar blocks FROM key-value store
WITH
    partitioning key >= A.user.contact.email.0 AND
    partitioning key <= A.user.contact.email.FFFFFFFF
GET columnar blocks FROM key-value store
WITH
    partitioning key >= B.user.contact.email.0 AND
    partitioning key <= B.user.contact.email.FFFFFFFF
GET columnar blocks FROM key-value store
WITH
    partitioning key >= A.user.contact.phone.0 AND
    partitioning key <= A.user.contact.phone.FFFFFFFF
GET columnar blocks FROM key-value store
WITH
    partitioning key >= B.user.contact.phone.0 AND
    partitioning key <= B.user.contact.phone.FFFFFFFF
```

In one embodiment, by only creating key-value lookup requests for a subset of label paths and attaching partitioning key constraints, the amount of data fetched from the key-value store (214) is optimized.

FIG. 5E is an illustration of an example of columnar block subset retrieval. This illustrates an example with many partitions of columnar blocks for a collection. Each partition is represented as a rectangle with an ordering chunk value. When a request for data is given, the data retrieval is optimized to only the subset of partitions based on label path and ordering chunk. Generated lookup requests only fetches data from the partitions marked with the dashes.

In one embodiment, after generating the list of lookup requests, requests are sent to the underlying key-value store (214) to fetch the resulting columnar blocks. In a distributed key-value store, the list lookup requests may be executed concurrently since the columnar blocks are partitioned and spread out to different data nodes. Since each lookup request is for one label path and one partitioning token, the results for a lookup request is a sequence of columnar block for a single label path. In one embodiment, each element of the resulting sequence is made of the partitioning key, the block key, and the block value bytes.

In one embodiment, for each unique label path, the result sequence is ordered by the partitioning key and then the block key to form a result run for the label path. The columnar blocks are merged from each label path result run with the same block key such that a set of columnar blocks for the same object are grouped together for processing.

In one embodiment, with a set of columnar blocks, one for each label path, grouped together, each block is decoded into a sequence of Attribute objects, one for each row item stored in the block. Each Attribute may have one or more AttributeValues. An Attribute may also be NULL. Then the Attribute objects from the same item index from each block are merged together to form a AttributeSet. The AttributeSet may then be translated back to a single JSON object.

Figure 5F:
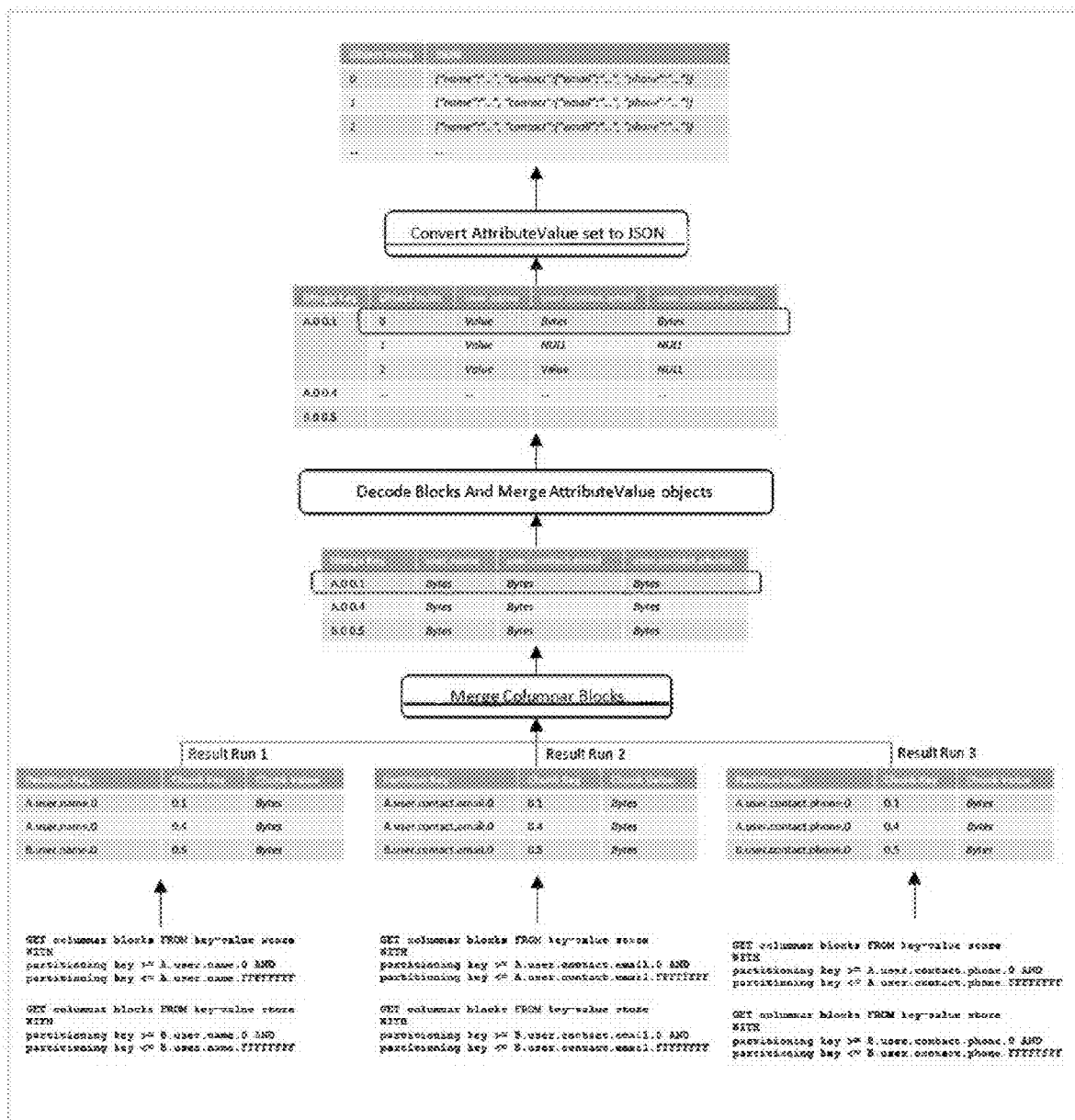
FIG. 5F is an illustration of regenerating JSON objects from columnar block lookups.

FIG. 5F is an illustration of regenerating JSON objects from columnar block lookups. In the example, to retrieve "name, contact" from the above example, the six lookup requests forms 3 result runs, one for each unique label path. The result runs are then merged to form sets of columnar blocks. Each set of columnar blocks are decoded and merged into AttributeSet objects. JSON objects are then created out of the AttributeSet objects.

Storing Columnar Blocks in Other Persistent Stores. In addition to storing columnar blocks in key-value type of storage, it is equally easy to store complex JSON data objects in fine granularity in other types of persistent store (214) such as files or relational databases. This is at least in part because columnar blocks use a simple and standardized data structure regardless of the complexity of the original JSON object.

In files, multiple columnar blocks may be serialized out as a sequence of blocks of bytes prefixed with the block key and the size of the bytes used. Multiple files may be used to hold partitions of the blocks with each file named using the partition key for the blocks. The size of the partition when storing blocks in files is flexible and need not be the same as the partitions used in a database.

To store columnar blocks in a relational database, it is simple to create a relational table of the following schema with a composite primary key of (Partition Key, Block Key). For relational database that supports partitioning, the table may be partitioned based on the value of the Partition Key, allowing the data to be distributed throughout the various data nodes of a distributed relational database, with an example relational schema:

| Partition Key (PK) | Block Key (PK) | Data |
|---|---|---|
| A.user.age.0 | 0.1 | Bytes |
| A.user.age.0 | 0.4 | Bytes |
| A.user.contact.email.0 | 0.1 | Bytes |
| A.user.contact.email.0 | 0.4 | Bytes |
| ... | ... | ... |
| B.user.name.0 | 0.5 | Bytes |

MELD: A JSON Columnar Store Application. As an example application, MELD uses the above conversion process. MELD (Massive Event and Log Daemon) is a Big Data analytics application that may manage massive amount of complex JSON objects using columnar blocks in a key-value store (214). MELD stores and retrieves event data and meta data objects. Event data is time series data such as measurements taken from sensors and user activity history. Meta data are business information such as user contact information, sensor locations, and order information. The characteristics of event data and meta data are different. Both event and meta data may contain complex data structure represented as JSON objects. Event data are generated in large quantities and do not change after creation. Event data need not have any unique identifiers. Meta data objects are relatively fewer comparing to the number of event objects. A meta data object may be updated and has unique identifiers. A meta data object may optionally have a timestamp value, while each event object may have a timestamp.

Encode the relational representation into a plurality of columnar block of data is supported. Key features of MELD comprise:

1. MELD stores complex JSON based event and meta data in key-value store (214) efficiently using JSON columnar blocks. Note that relational formatted data, such as data in CSV format or from relational databases, may be represented as a JSON object made of a single map of column name to column values, giving rise to the ability to handle complex JSON data including the ability to handle relational data;
2. JSON columnar block generation and mapping to key-value stores (214) are automated. As a result, the user does not need to declare and maintain any schemas before storing events or meta data in MELD;
3. MELD handles large amount of event and meta data by distributing the data across multiple data partitions;
4. MELD provides efficient retrieval of a subset of data based on a subset of the label paths or a timestamp range;
5. MELD allows advanced query based joins between event objects and meta objects using an analytical SQL query engine;
6. Event and meta data are often loaded in batches. MELD provides data management features such as tracking batch operation status;
7. Event data may be deleted based on timestamp range or insertion batch id;
8. Meta data may be updated or deleted by the primary key; and/or
9. MELD provides a REST API allowing easy integration with other applications.

Using MELD, a user may quickly insert data from any data source and start analyzing the stored data via advanced SQL queries. In comparison, the traditional approach of data analytics for a new data source requires first designing a normalized or de-normalized schema for the data store, then writing code to transform source data into the schema, and implementing various data management functions and APIs. While the traditional approach may take months to develop, MELD does the same with out of the box functionalities, allowing users to start analyzing the data in hours instead of months.

Figure 6A:
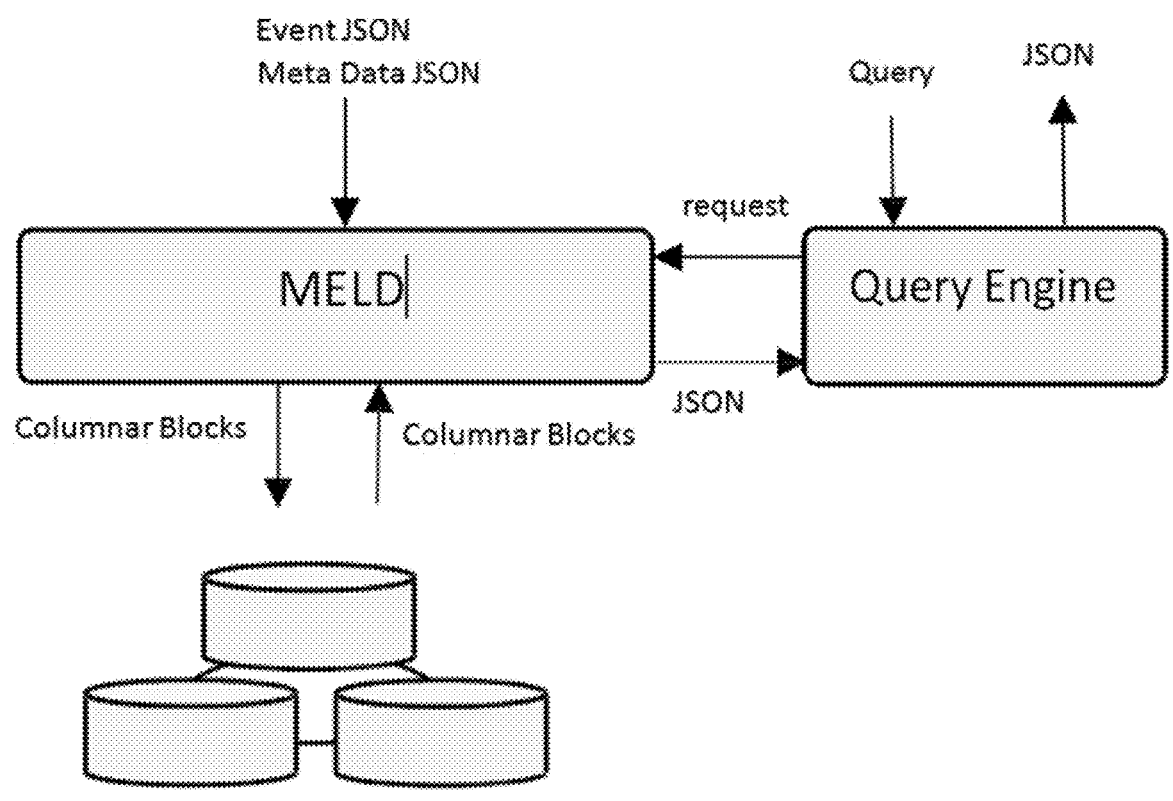
FIG. 6A illustrates MELD Single Mode Runtime.
Figure 6B:
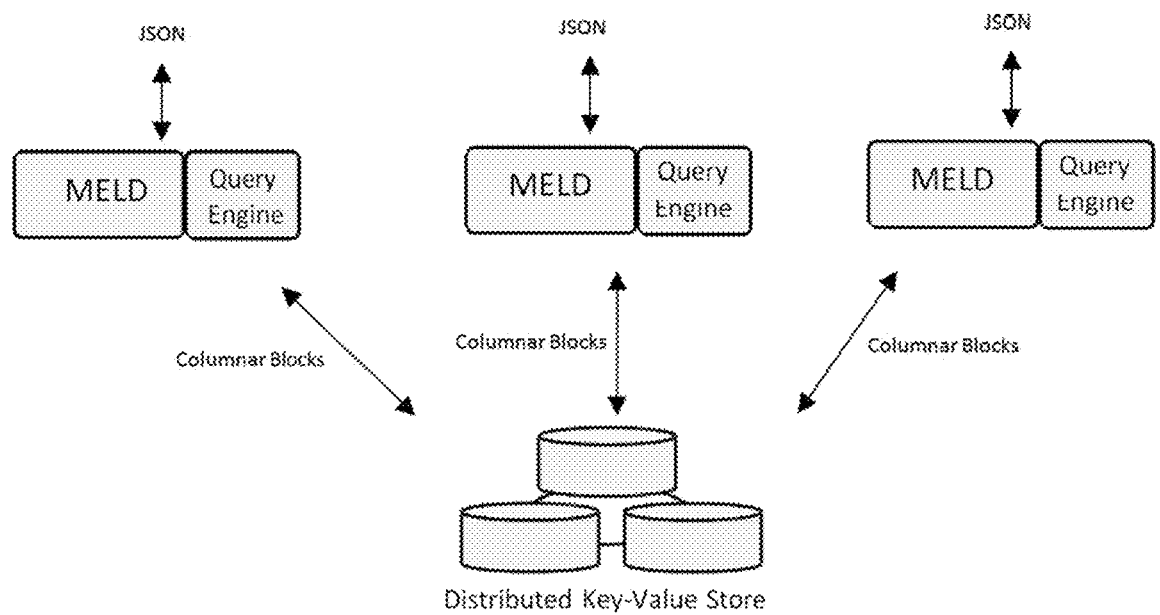
FIG. 6B illustrates MELD Multi-mode Runtime.
Figure 6C:
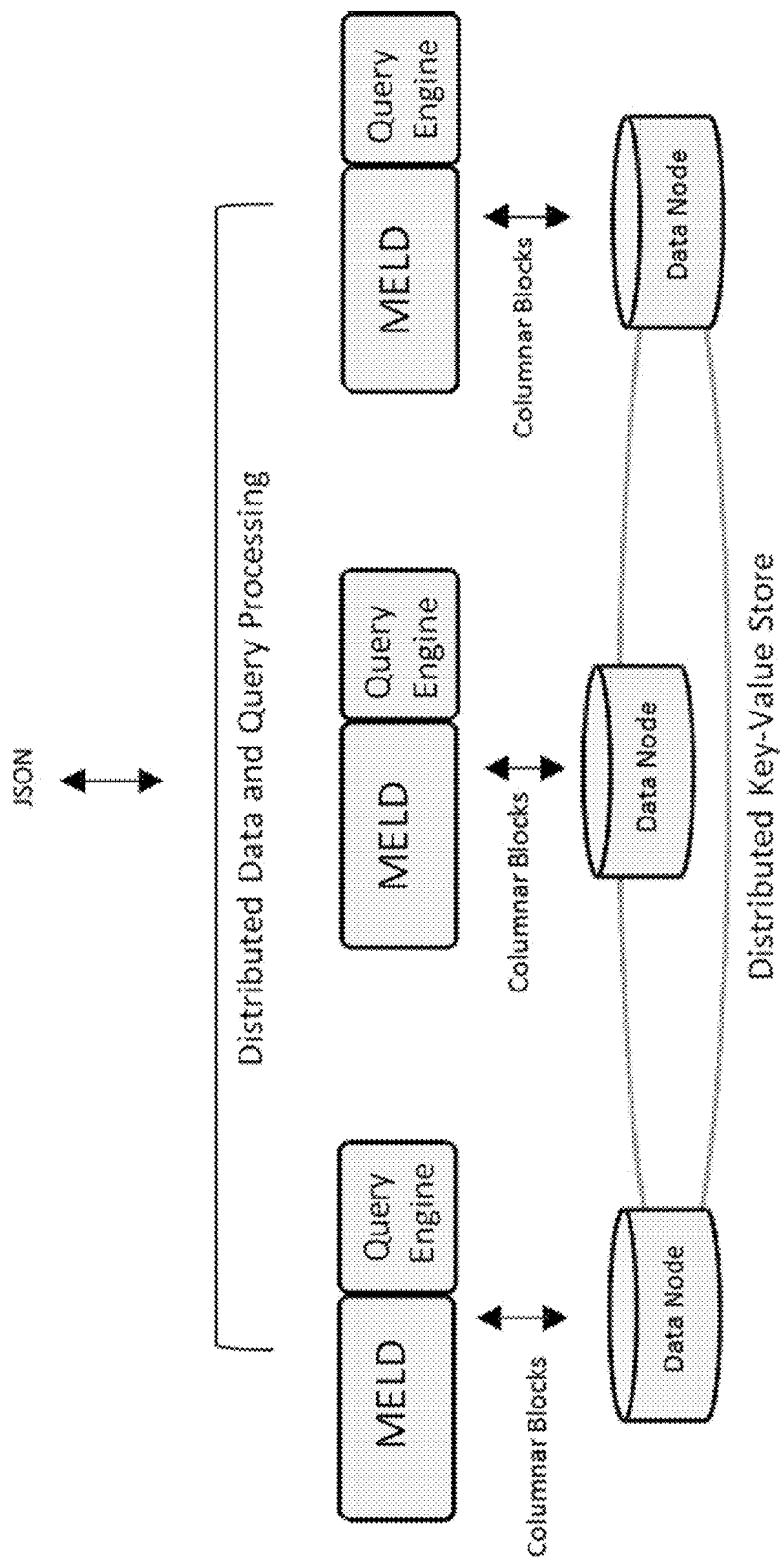
FIG. 6C illustrates MELD Partitioned Mode Runtime.

FIGS. 6A-6C illustrate the overall MELD architecture. A MELD web server is setup to provide the REST API allowing the caller to insert, delete, update, and query Event and Meta Data. After the data is received, MELD converts it into columnar blocks and stores the blocks inside an external distributed key-value store, such as Apache Cassandra or Hadoop HBASE. MELD interfaces with an external query engine such as Apache Drill or Apache Spark.

When the query engine accepts a SQL query, it sends a request for data to MELD. The request is sent along with any constraints on the data requested such as timestamp range and the selected column subset. MELD fulfills the query engine request by reading only the needed columnar blocks out of the distributed key-value store (214), merge and construct JSON based results and sent back to the query engine. The query engine then takes the returned JSON data, performs additional operations such as joins and aggregation, and sends the final results to the caller.

MELD may be setup in three runtime modes: single mode, multi-mode, and partitioned mode. FIG. 6A illustrates MELD Single Mode Runtime. In the single mode, there is one instance of MELD and the query engine. The single instance of MELD distributes the data properly across the multiple nodes of a distributed data store. MELD retrieves data from all data store nodes and sends back to the query engine to form the query results. The query engine is typically co-located on the same server as MELD to allow low-latency data transmission from MELD to the query engine. It may be quick and easy to use single mode to get started with new data analytics using MELD.

FIG. 6B illustrates MELD Multi-mode Runtime. Multi-mode extends the single mode by adding multiple identical MELD+query engine pairs. Each MELD+query engine pair functions the same way as the single mode. Multi-mode adds redundancy and increased scale and performance. However, there may be no communication between the various MELD instances or the query engine instances. Each request is processed by a single instance only. For example, when a query is submitted, only one query engine and one MELD retrieves the data for the results. Multi-mode is good at handling many concurrent queries and providing fault-tolerance.

FIG. 6C illustrates MELD Partitioned Mode Runtime. In partitioned mode, there are multiple pairs of MELD+query engines working in concert. Each MELD instance handles a partition of the data. When a query is submitted, different data partitions are retrieved by the corresponding MELD instances. Multiple query engines also work in concert first computing the local results using the data received from the local MELD and then merge all local results together to form the final query output.

In data analytics, queries frequently involve joining event with meta data, applying predicate filters and grouping against the meta data and aggregation on event data. To facilitate these types of queries, meta data is setup to be replicated on all data nodes while event data is partitioned across the data nodes. This configuration further speeds up distributed join by first performing local joins using local meta data and event data partition without the need to broadcast meta data from one query engine to another query engine in the cluster.

Each MELD instance has affinity to a subset of data storage nodes. The data locality preference may be configured based on the physical proximity of the MELD instance and the data node. For example, a MELD instance has affinity to the data node co-located on the same server. In that case, MELD instance may access the local data node without networking bottleneck and latency. Query engine may also be co-located on the same server allowing fast data retrieval and local data computation without accessing the network. Partitioned mode provides high performance for very large queries and data updates.

Partitioned mode and multi-mode may be combined such that each partition in the partitioned mode may have multiple identical MELD+query engine pairs. This combined configuration allows multiple concurrent big queries to be processed and adds redundancy.

Figure 6D:
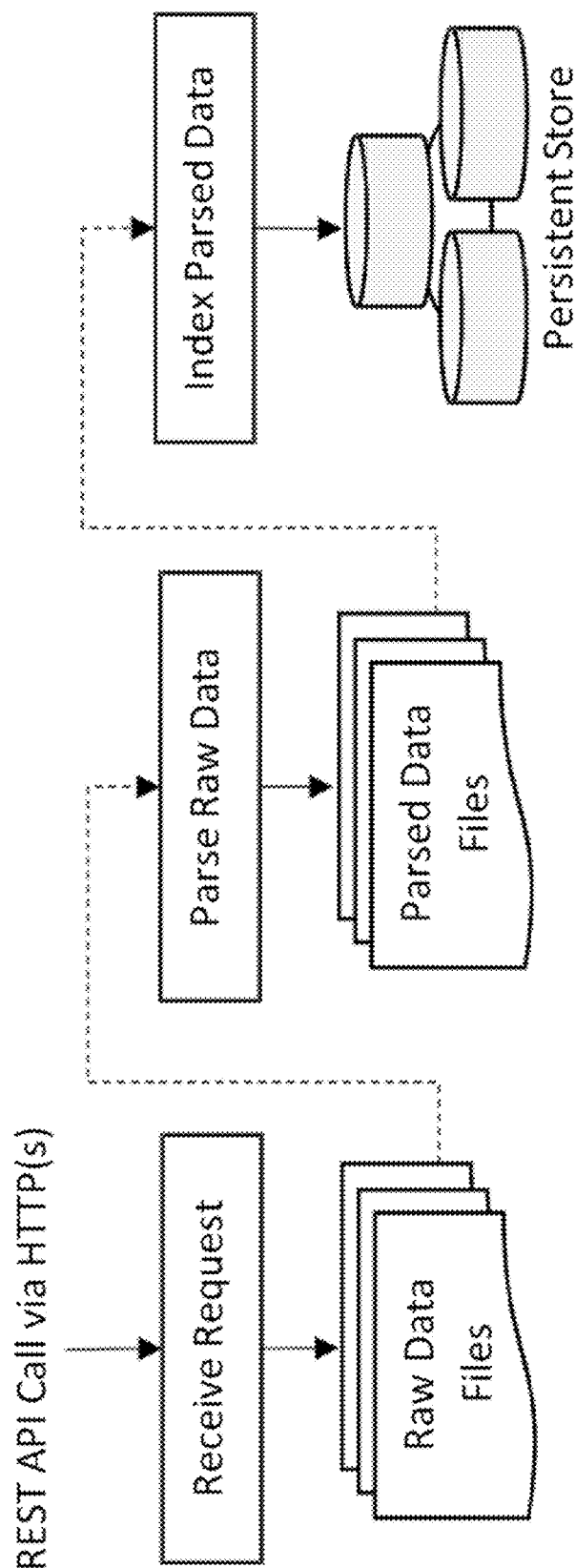
FIG. 6D illustrates the 3 independent data pipelines used in MELD.

FIG. 6D illustrates the 3 independent data pipelines used in MELD. MELD uses data processing pipeline to handle data insertion and update requests. There are three data processing pipelines. When the data is first received by MELD, the incoming request parameter and data payloads are stored as is in raw data files. A receipt on the request is immediately returned to the caller. A second data processing pipeline, parse raw data, continuously monitors any changes to the raw data files. Upon detecting a change, the raw data parser picks up the new raw data file and produces parsed data files as the output. A third stage data processing pipeline, index parsed data, monitors the parsed data files for changes. When changes in parsed data files happens, MELD loads the parsed data files and indexes the content into the external persistent store (214).

These three data processing pipelines are not dependent on each other. Rather, each pipeline runs independently monitoring its input location for data change and writes out the results and the status of the processing in the output location. MELD uses this design to achieve high flexibility, performance and fault tolerance. For example,
1. There may be more threads running the parse pipeline comparing to the receive pipeline;
2. MELD may index data files generated by an external application;
3. MELD may restart a data pipeline without impacting the other ones. For example, one may redo the indexing step without re-parsing the data; and/or
4. Each pipeline is designed to be idempotent. If a server crash occurs, simply restarting the server and the system continues the data processing.

MELD tracks the status of the original request through the 3 data pipelines. This is done by attaching the original receipt with output data from each of the data pipeline stage, as well as recording the status per pipeline per receipt. Callers may submit a request for status using the receipt from the initial request.

MELD Event Data Store. MELD stores event data differently from meta data using JSON columnar blocks. Event data are time series data points. Each data object may have a timestamp representing the event time. During the insertion of event data objects, the caller designates one or more JSON label path pointing to the timestamp column. For example, if an event data object is:

```
{
    "ts":"2015-12-20 23:23:21",
    "total":234.33,
    "coordinate":[12.32, 45.21]
}
``` the caller may specify at the insertion time that the label path "ts" is the event timestamp. MELD then parses and assigns the value of the "ts" as the event timestamp of this object. When no event timestamp label path is specified, MELD uses the receive time as the event timestamp.

Event data may also be submitted in relational format. The same example may be sent to MELD as a CSV formatted value:

```
ts,total,coordinate-x,coordinate-y
2015-12-20 23:23:21,234.33,12.32,45.21
```

Each event object is assigned a globally unique identifier called the event id. Each event object is also tagged with the request receipt id. When a single request may contain multiple event objects, all the event objects for that request are tagged with the same request receipt id.

MELD then parses each user submitted event data object into its corresponding AttributeSet representations, creates columnar blocks, and stores into the key-value store (214). The AttributeSet contains all the information from the original event object, plus 2 additional values: event timestamp and request id. These 2 additional values are used to support time and request id based event deletion.

To create columnar blocks, MELD first orders the AttributeSet objects based on their event timestamp. Then it divides the event timestamp value by a configured event timestamp divisor value. The resulting quotient is the time chunk value for each AttributeSet object and the time remainder value is the time remainder for the AttributeSet object.

MELD then groups the AttributeSet objects by their time chunk value, and then orders within each group by the time remainder value. Then every N objects are taken from each group to form a block of AttributeSet objects. The value N is a MELD configuration value and is configured by default to place up to 100 AttributeSet objects for event data in a block. Each block of AttributeSet object is then encoded into multiple columnar blocks, one for each label path.

The columnar blocks are then stored into a key-value storage cluster. On the key-value storage cluster, a container is created to store event columnar blocks. This container is typically setup to shard the columnar blocks among the different data nodes of the cluster. Using a shard configuration for event columnar blocks is beneficial because there are typically very large quantities of event objects.

For the event data columnar blocks, MELD creates a partitioning key for the key-value store (214) as follows:
partitioning token—Each MELD instance is configured with 1 or more event partitioning tokens. MELD randomly chooses one of the configured token as the partitioning token for the columnar block. The configured tokens are chosen based on the underlying distributed key value store configuration. For example, if the key-value store has 3 data nodes, then a minimum of 3 tokens are configured, one for each data node. By randomly choosing one of the 3 tokens, MELD evenly spreads out the columnar blocks among the 3 data nodes. In the single-mode and multi-mode configurations, MELD configures 1 token for each data node in the storage cluster. In the partitioning mode, each MELD instance may be configured to send data to a subset of the storage cluster data nodes. But the union of all tokens used may allow data to be sent to all data nodes of the cluster to avoid storage hot spots;

scope, collection, label path—MELD attaches the scope name, the collection name, and the label path to the event object. In MELD, collections of event objects are located inside a data scope allowing multiple collections to use the same name as long as they are located in different data scope. For example, "east"."sensorData" and "west"."sensorData" are two different collections, one in the "east" data scope and another in the "west" data scope. Both collections have the name "sensorData"; and/or time chunk—The time chunk value from the event objects within the columnar block. Note that all AttributeSet objects in a single columnar block have the same time chunk value.

In a next step, MELD creates a column key for the columnar block as follows;

time remainder—The time remainder value for the first AttributeSet object in the columnar block. Note that not all objects in a columnar block have the same time remainder value, but all time remainder values from a columnar block are less than or equal to the time remainder value from the objects in the next columnar block; and/or object id—The event id from the first AttributeSet in the columnar block.

Even though event objects never change after creation, there are cases when event objects need to be deleted. Often, the event data come from an external source and are loaded in bulk into MELD. When data come from an external source, there is sometimes a need to update the content of an earlier feed such as corrections, additions, and so forth. For example, assume there is a daily feed of user activities from an external data source. Sometimes, a previously received daily feed that is already loaded into MELD is updated with more accurate information. Users need to be able to reload the event data to bring MELD up to date.

To reload the event data, event objects are deleted first by timestamp range or by request id. For example, the user may issue a request to MELD to delete all event objects from Tuesday to Friday. At a next step the updated data for that time range is reloaded. When the events are bulk loaded into MELD originally, MELD returns a receipt id for each request. The caller may also request MELD to delete all event objects with the receipt id and then re-insert the updated data.

MELD uses the process described above to retrieve event data. MELD receives a request for data from the query engine for an event collection. MELD creates a key-value store lookup request for each combination of partitioning token, event collection name, and label path requested. For each lookup request, there is a partition order chunk constraint made of a minimum time chunk value and a maximum time chunk value based on the original retrieval request. The lookup requests are then sent to the key-value store (214) to retrieve the columnar blocks. The columnar blocks from different label paths are then merged and parsed back to AttributeSet objects and reconstituted back to JSON objects. The JSON objects are passed to the query engine for further processing.

Leveraging the automated process of mapping JSON to relational representation as AttributeSet, and storing AttributeSet as columnar blocks on key-value store (214), MELD is able to efficiently store large amounts of event objects partitioned across numerous data nodes of a database. MELD may also efficiently retrieve the event objects or a subset of event attributes. As the partitioning key is stored with the event timestamp based time chunk and time remainder, the data is ordered by time inside the data store. The output data is automatically returned in time order without the need for explicit ordering by time. MELD may fetch and delete event data within a time window efficiently by working only with columnar blocks with the right time chunk values. The time based partitioning also allow MELD to easily support data retention policies: archiving and deleting older event objects.

MELD Meta Data Store. Meta data represents business information such as customer information, order information, or product information. Each meta data object may have a unique identifier. For example, each customer information object has a unique customer id. Each product information object has a unique product identifier. Unlike event data, meta data may allow updates based on their unique identifiers. For example, the address of a customer object may be updated. The status of a purchase order may be updated to complete or cancelled after purchase order creation. Business information may be time sensitive, but is not considered time series information because the need to update the data points within the meta data object after the initial creation.

The caller may insert, update, and delete meta data in MELD. Meta data may be provided as complex JSON objects. For example, a customer information meta data object may look like:

```
{
    "userId":"A38C23",
    "name":"Julien Smith",
    "age":23,
    "coordinate":[[12.3, 23.2], [21.2, 23.3], [21.5, 7.3]],
    "online":false,
    "contact":[
        {
            "phone":"555-1234",
            "email":"julien@acme.com"
        },
        {
            "phone":"555-6353"
        },
    ],
    "last updated":"2015-03-21 16:32:22"
}
```

To add meta data object to MELD, the caller may indicate which label paths of the data are the primary key to the object. In the above example, the caller specifies that the "userId" is the primary key to the data. Primary key may also consist of multiple label paths. Suppose the caller indicates that the primary key is "userId" and "name", then in MELD, the combined data "A38C23" and "Julien Smith" is used as the primary key. The user may optionally designate a timestamp value for a meta data object by specifying one or more label paths pointing to the time value.

MELD also accepts meta data in relational format such as CSV formatted data files. Relational formatted data is treated as a JSON object with a single map of column name to column value.

Similar to storing event data, MELD stores meta data values using columnar blocks in a distributed key-value store (214). Each meta data object is first parsed into its corresponding AttributeSet object. If the optional timestamp label path is given, then a meta data timestamp value is created and added to the AttributeSet object. The AttributeSet objects are then grouped into columnar blocks and stored using the process described below.

Unlike event data, MELD uses an additional container to record a mapping from the primary key value of the meta object to an information pair: a columnar block id and a position number. The columnar block id and the position number point to the columnar block in which the AttributeSet object is stored.

For example, a table of primary key to columnar block ID and position is:

| Primary Key | Columnar Block ID | Block Position |
|---|---|---|
| A38C23 | 0x4c73366a71554139687042744662786f304954 | 2 |
| A8E3C3 | 0x4c73366a71554139687042744662786f304954 | 3 |
| A492F2 | 0x4c73366a70554139687042744662766b304a30 | 2 |
| ... | ... | |

For each AttributeSet object, MELD first looks up the mapping table using the primary key value from the corresponding meta data object to locate its columnar block id and block position. If a columnar block id and block position are found, update the columnar block to remove existing data for the meta data object, and the detail of this deletion process is described below.

After the existing values are removed, all AttributeSet objects are sorted by its meta data timestamp value. If a meta data does not have a timestamp, then the value 0 is used. It then divides the meta data timestamp value by a configured meta data timestamp divisor value. The resulting quotient is the time chunk value for each AttributeSet object and the time remainder value is the time remainder for the AttributeSet object.

For each AttributeSet object, MELD creates a partitioning key value for the object as follows:

partitioning token—MELD computes a partitioning token value based on a combination of hashing output from the primary key value, hashing output from scope, collection, and label path;

scope, collection, label path—MELD attaches the scope name, the collection name, and the label path to the meta data object. In MELD, collections of meta data objects are located inside a data scope allowing multiple collections to use the same name as long as they are located in different data scope. For example, "east"."customer" and "west"."customer" are two different collections, one in the "east" data scope and another in the "west" data scope. Both collections have the name "customer";

time chunk—The time chunk value from the meta data objects within the columnar block. Note that all AttributeSet objects in a single columnar block have the same time chunk value; and/or spread—Unlike event data, an extra value called spread is generated out of the hashing output from the primary key value.

The result of generating the partitioning key from the above is to ensure:

1. Distribution of the meta data objects evenly across the distributed key-value cluster;
2. Grouping of records from the same scope.collection or scope.collection.label together to enable efficient scans to locate data for a table/label without scanning all rows;
3. If records are time sensitive, grouping of records from the same time frame together for easier removal and archiving at a later point; and/or
4. Within a single storage node, limiting the value size for a first level map key with a spread value.

A next step is the ordering of all the AttributeSet values based on the generated partitioning key. Every N objects are taken from each group to form a chunk of AttributeSet objects. The value N is a MELD configuration value and is configured by default to place 10 AttributeSet objects for meta data in a chunk. Each chunk of AttributeSet object is then encoded into multiple columnar blocks, one for each unique label path. All columnar blocks for the same AttributeSet chunk share the same columnar block id. The columnar block id is a unique global monotonically increasing value.

For each AttributeSet object in the chunk, MELD inserts into the mapping table the primary key value, the columnar block id, and the position number within for the object. The columnar blocks are then stored into a container in a key-value storage cluster. This container is typically set up to shard the columnar blocks among the different data nodes of the cluster. Using a shard configuration for meta data columnar blocks is beneficial for large quantities of meta data objects.

Deletion of meta data object happens in two scenarios. First, during insertion of meta data if the data was previously inserted, the existing data is deleted first before adding the modified data. Second, the user may request a deletion of meta data by supplying the primary key. At deletion, MELD first looks up the columnar block id and the block position from the mapping table using the given primary key value, then loads all the columnar blocks with the block id, one for each label path of the object. For each columnar block read, MELD iterates through each value inside the block, skipping the value at the looked up block position, to create a new columnar block. The new block is inserted back into the key-value store using the same columnar block id, replacing the existing columnar block.

The insertion and deletion process described above may lead meta data objects to be appended to new columnar blocks and removed from a columnar block. The values are never updated in place inside a columnar block.

MELD uses the process described above to retrieve event data. For data retrieval, the mapping table from the primary key to the block key and position may not be used. MELD receives a request for data from the query engine for a meta data collection. MELD creates a lookup request for the key-value store (214) for every combination of partitioning token, meta data collection name, and label path requested. For each lookup request, there is also a partition ordering chunk constraint made of a minimum time chunk value and a maximum time chunk value based on the original retrieval request. The lookup requests are then sent to the key-value store to retrieve the meta data columnar blocks. The columnar blocks from different label paths are then merged and parsed back to AttributeSet objects and reconstituted back to JSON objects. The JSON objects are passed to the query engine for further processing.

Leveraging the automated process of mapping JSON to relational representation as AttributeSet, and storing AttributeSet as columnar blocks on key-value store (214), MELD is thus able to efficiently store large amounts of meta data objects partitioned across numerous data nodes of a key-value store. MELD may also efficiently retrieve the meta data objects or a subset of meta data attributes.

For meta data objects that have timestamps, the partitioning key used contains the meta data timestamp based time chunk and time remainder, resulting in the data being ordered by timestamp. The output data is automatically returned in time order without the need for explicit ordering. MELD may fetch meta data within a time window efficiently by working only with columnar blocks with the right time chunk values. The time based partitioning also allows MELD to easily support data retention policies: archiving and deleting older event objects.

Figure 6E:
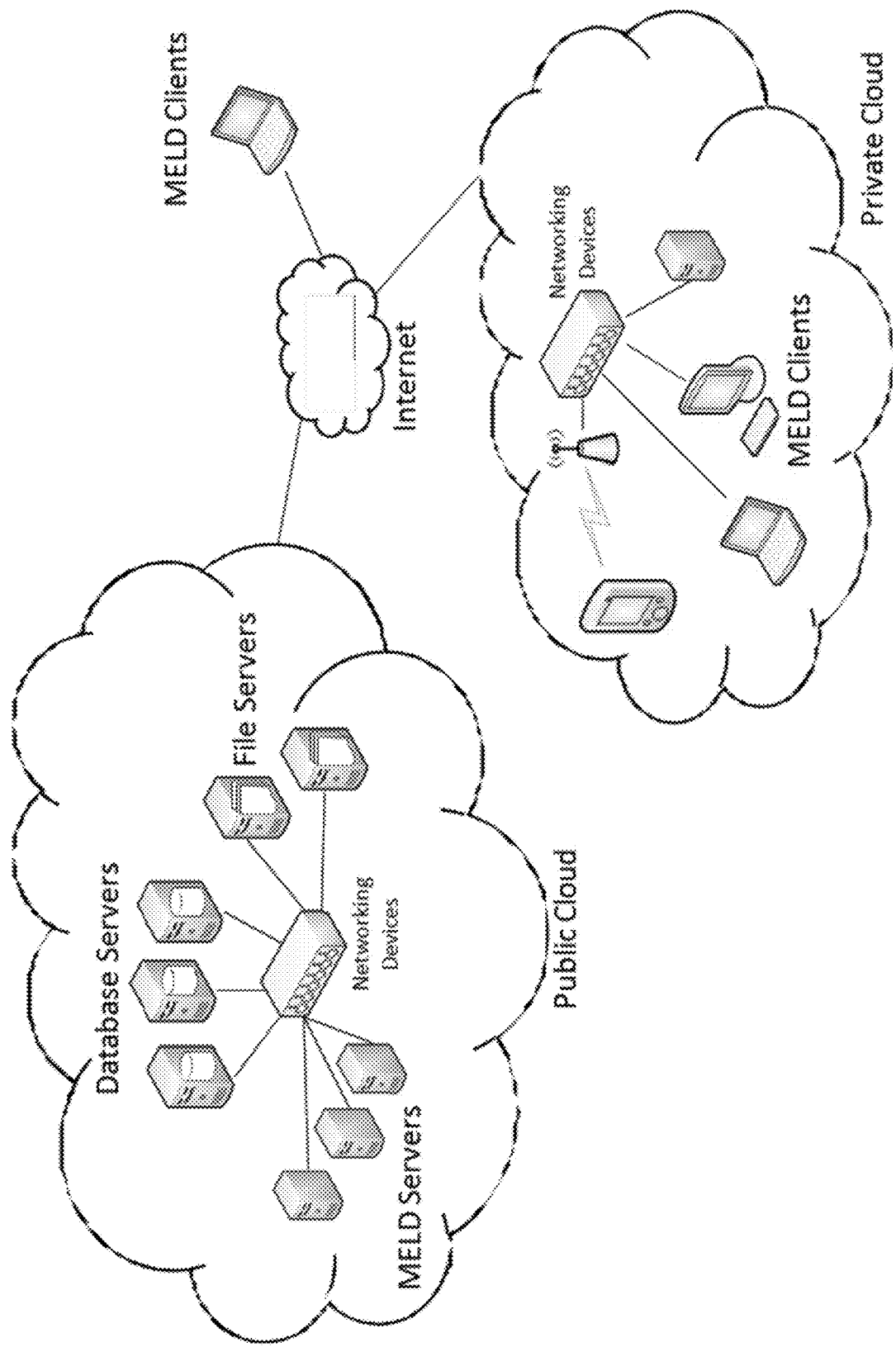
FIG. 6E is an illustration of a MELD deployment.

FIG. 6E is an illustration of a MELD deployment. MELD runtime may be flexibly setup in multiple scenarios such as on-premise private cloud installation, hybrid public-private cloud, or as a SAAS ("Software as a Service"). Throughout this specification, a "cloud environment" generally refers to a set of interconnected resources such as computers, networking devices, and storage devices. The resources within a cloud environment may easily communicate with each other through wired and wireless networking. However, access from the outside to resources in a cloud environment is highly controlled and restricted. A private cloud typically refers to a cloud environment constructed with resources acquired by a company for exclusive use by the company, such as a company's data center. A public cloud typically refers to a cloud environment constructed using a flexible number of pay-per-use resources from an external cloud provider such as Amazon AWS, Microsoft Azure, and Google Cloud Platform.

In an on-premise private cloud scenario, the MELD server, integrated with the query engine, is installed on one or more computers. On a computer, MELD server launches multiple concurrent processes with each process having multiple threads within. The MELD server processes from all the computers may communicate with each other and with storage system resources through the networking devices in the private cloud.

The MELD server processes on a computer store data in two types of storage: file and database. MELD processes read and write temporary data and work data on files. Each MELD server installation on a computer uses its own set of files without conflicting with other MELD servers. The files may be stored either on locally attached disk drives, on a shared file system, or a distributed file system such as HDFS. A distributed file system also uses multiple computers as file servers. The computers used by the distributed file system servers may be the same as the computers used by MELD or may be setup as separate computers. MELD reads and writes columnar blocks to an external database system. The database system may be either an Open Source or commercial relational database such as MySQL, Postgres, Oracle, SQL-Server, etc. The database system may also be a NoSQL database such as MongoDB, Cassandra, Hadoop HBASE, etc. The database system executes one or more database servers on one or more computers. The computers used by the database servers may be the same as the computers used to run MELD servers or may be setup as separate computers.

A MELD client is typically a computer program used by a human operator or as a part of another computer program that inserts, updates, or deletes data in MELD servers and retrieves data from MELD servers. A MELD client may be implemented using any programming language such as Java, C#, C++, Python, Go, etc. running on a desktop or server class computer, a laptop computer, or a mobile device. A MELD client may run remotely on separate computers communicating with MELD through HTTP or HTTPS based APIs over a wired or wireless network. A client sends insert, delete, and update JSON data requests to MELD servers through the APIs. The clients may retrieve JSON data using SQL queries through the HTTP or HTTPS based APIs or through an industry standard protocol such as JDBC or ODBC.

Multiple MELD clients running on the same or separate computers may concurrently submit requests to MELD servers. MELD clients may be used not only by the company running MELD servers, they may also be used by the company's partners to add and retrieve data from the MELD servers.

In a public-private cloud hybrid environment, the computers in the public cloud communicate with the computers in the private cloud environment through private networking channels established by the networking devices. MELD servers, files and databases used by MELD servers, are typically setup on the computers in the public cloud environment. MELD clients are typically setup on computers in the private cloud environment to load data available in the private cloud environment and send to MELD runtime in the public cloud environment through MELD APIs over the private networking channels. If the company permits, certain MELD clients may also be allowed access to the MELD servers from the Internet outside of the company's private network.

In a SAAS setup, a SAAS provider is an independent company that installs and manages the MELD software, servers, computers, file systems, and the database systems. The SAAS provider may use its own public cloud, public-private cloud, or private cloud environment in managing its computer resources. The SAAS provider sets up a MELD data space for a client company and opens one or more public network access points using a secure communication protocol such as HTTPS to allow client company to securely access the MELD runtime through the Internet. The client company manages the MELD client programs. The client company runs the MELD client programs on its own computers sending and receiving data through the Internet using secure communication with the MELD servers managed by the SAAS company. A SAAS company may support multiple MELD clients from different client companies at the same time by assigning unique client access key to each client company and attaching the data access through the access key to the appropriate client company data space. The data from each client company may be kept in separate data spaces on the file system and database by the same MELD servers. The SAAS company also has the option of setting up separate and distinct MELD runtimes, file systems, and database systems for each client company.

User Applications of MELD. MELD may be used in data warehouse applications storing and joining large amount of data from diverse sources with diverse formats. Event data are generated at different times from business metadata in a large number of real-world applications. Engineering and IT teams have a need for design and build of a processing pipeline to capture event data, ETL out the metadata, define proper data models and schemas to represent these data for future analysis, and normalize or denormalize the incoming data into the defined schema representations before any analysis may be performed on the data. Many times the steps have to be repeated a number of times as certain types of analyses requires data to be transformed and represented differently. These steps usually take months to develop into a production-level system. MELD automates the entire process and reduces the time to analysis from months to a few hours. The key aspects of MELD that enable this speed up are: (i) an automated pipeline to take JSON and convert to relational representation; (ii) storing the relational representation into a columnar block storage; (iii) utilizing Open Source distributed NoSQL/SQL databases to store the columnar data; and (iv) providing a SQL interface to query the data. These features enable the user to skip the data modeling, schema definition, normalization, denormalization, and multiple iterations of these. The user is able to perform analyses and generate report using the SQL interface. Some of the applications where MELD may be utilized are as follows.

IoT. MELD is ideally suited for providing IoT ("Internet of Things") data analytics combining sensor data with business information such as customer information, geo-location, weather data, and social data. Utilizing MELD's REST APIs, the sensor devices may periodically upload event data into MELD. The business information may be uploaded into MELD at different times based on their availability by a separate user business application(s). The client application may also independently query the MELD system using SQL interface or JDBC/ODBC connection, or via text or JSON files using REST Query API. The results may further be analyzed in any visualization systems such as Tableau, Microstrategy, Kibana, and so forth. A client may integrate MELD into their business application in the above defined manner in only a few hours.

Analyzing Customer Behavior. Another use case includes analyzing customer interactions for advertising purposes. For example, MELD may be used for binding customer interaction data from consumer devices, mobile apps, or web activities. The event data are then combined with household information, location, and social data from other data sources to create cohort analysis or targeting rules for advertising.

Replacement for Expensive Data Warehouse System. MELD may also be used as a less expensive replacement to expensive non Open Source data warehouse systems, since MELD utilizes more cost-effective Open Source NoSQL and SQL databases for data storage. MELD may be set up using SAAS or on premise installation for the client. MELD utilizes the distributed and horizontal scaling capabilities of Open Source solutions to provide scale and proprietary columnar block storage to provide efficient data filtering, query, joins, and retrieval capabilities. As a result, MELD brings data warehouse capabilities to Open Source storage systems without the user implementing complex data ingestion and management codes.

Figure 7:
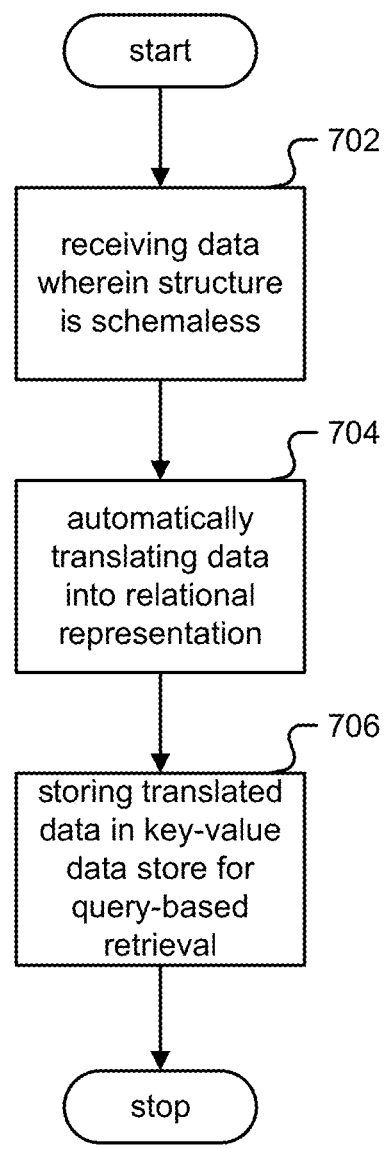
FIG. 7 is a flow chart illustrating an embodiment of a process for schemaless to relational representation conversion.

FIG. 7 is a flow chart illustrating an embodiment of a process for schemaless to relational representation conversion. In one embodiment, the process of FIG. 7 is carried out by the system of FIG. 2.

In step 702, a set of data is received that includes a plurality of event data objects and a plurality of meta data objects, wherein a structure of the set of data is a schemaless data representation. In one embodiment, a structure of the set of data is a schemaless JSON hierarchical data representation. In one embodiment, a structure of the set of data is a schemaless JSON hierarchical data representation, and wherein the plurality of event data objects includes time series data that includes measurements from a plurality of sensors and/or user activity history for a plurality of users.

In one embodiment, a structure of the set of data is a schemaless JSON hierarchical data representation, wherein the plurality of event data objects includes time series data that includes measurements from a plurality of sensors and/or user activity history for a plurality of users; and wherein each of the plurality of event data objects includes a timestamp.

In step 704, the set of data is automatically translated into a relational representation. In one embodiment, automatically translating comprises at least one of the following: translating an array map value in the set of data to an ordered multi-map; converting the ordered multi-map to the relational representation; generating a label path for an object associated with the ordered multi-map; generating an index path for a value associated with the label path; determining a value type for a value associated with the label path; translating a nested array in the set of data into a nested ordered multi-map; converting the nested ordered multi-map to a relational representation; generating a label path for an object associated with the nested ordered multi-map.

In step 706, the translated set of data is stored in a key-value data store for a query-based retrieval. In an optional step (not shown), the relational representation is encoded to a columnar block of data and/or the columnar block is stored in the key-value data store. In an optional step (not shown), the translated set of data is distributed across a plurality of partitions. In an optional step (not shown), the translated set of data is distributed across a plurality of partitions, and wherein metadata is stored in partitions with the translated set of data. In one embodiment, a schema is not required for automatically translating the set of data into a relational representation. In an optional step (not shown), an atomic value and an array of a single value are distinguished apart. In an optional step (not shown), an array map element and a nested array element are distinguished apart. In an optional step (not shown), a non-map root value is recognized. In an optional step (not shown), relational queries are accepted.

Figure 8A:
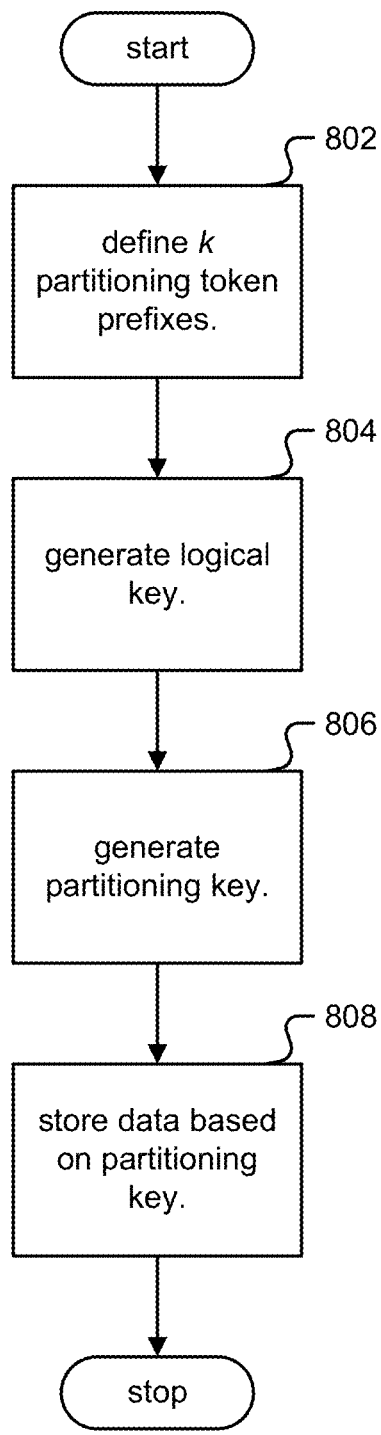
FIG. 8A is a flow chart illustrating an embodiment of a process for key-value database storage for balanced key range based retrieval.

FIG. 8A is a flow chart illustrating an embodiment of a process for key-value database storage for balanced key range based retrieval. In one embodiment, the process of FIG. 8A is carried out by the system of FIG. 2.

In step 802, a plurality of partitioning token prefixes, say k prefixes, are defined. The partitioning token prefix for the data object may be based on a randomizing hash.

A partitioning key with the same partitioning token prefix are stored in the same storage node in a key-value store. The partitioning token prefix may be identical for all columnar blocks of the same objects. The partitioning token prefix may be associated with a load balance for storage. The partitioning token prefix may be less than 3 bytes, for example 2 bytes. The partitioning token prefix may be a hash of a primary identifier associated with the data object. The partitioning token prefix may be a combination of a hash of a primary identifier associated with the data object and a hash of a collection name associated with the data object. In the example given in FIG. 5D, k=2 prefixes corresponding with the two data nodes Data Node A and Data Node B.

In step 804, a logical key is generated for each data object, such that related data have logical keys that are closer to each other. The logical key may be determined based at least in part on an ordinal range associated with a given data object. The logical key may be determined based at least in part on a name of a collection and label path. The logical key may be determined based at least in part on an ordering chunk. The logical key may be determined based at least in part on an ordering chunk, wherein the ordering chunk is a time chunk based on a timestamp associated with the data object. The logical key may be determined based at least in part on an ordering chunk, wherein the ordering chunk separates data in a collection into a set of time series. The logical key may be determined based at least in part on an age chunk. Examples of logical keys comprise collection name, label path, ordinal range, ordering chunk, time chunk, and age chunk.

In step 806, a partitioning key is generated for each data object, such that the partitioning key is a combination of a randomly chosen partitioning token prefix and the logical key from step 804. In step 808, a data object is stored in the key-value store based at least in part on the partitioning key. Examples of a key-value store comprise Cassandra and HBase. Thus, a given data object is randomly placed on a storage node based on the randomly chosen partitioning token prefix, as shown in FIG. 5D and FIG. 5E, and in one embodiment, applied for each logical columnar data set. On the same storage node, data is ordered by the logical key. In one embodiment, a portioning key is associated with a second level ordered key-value map, wherein the portioning key comprises at least one of: a block key, a column key, a clustering key, an order remainder, and an object id.

Figure 8B:
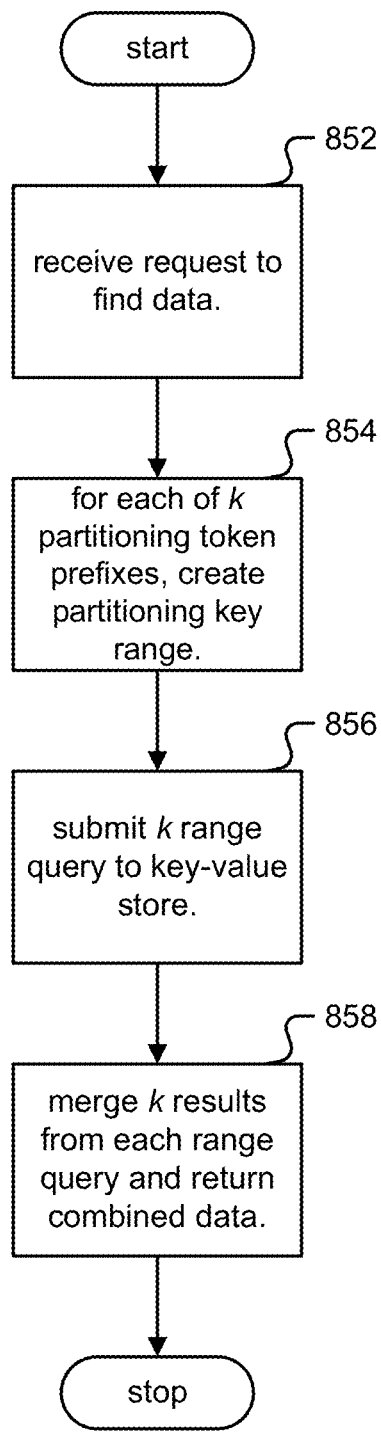
FIG. 8B is a flow chart illustrating an embodiment of a process for key-value database requests for balanced key range based retrieval.

FIG. 8B is a flow chart illustrating an embodiment of a process for key-value database requests for balanced key range based retrieval. In one embodiment, the process of FIG. 8B is carried out by the system of FIG. 2.

In step 852, a request is received to find data. In one embodiment, the request is based on a range condition against the logical key. For example, the range condition may be a username between 0 and FFFFFFFF.

In step 854, for each of k partitioning token prefixes, a partitioning key range is created by prepending the partition token prefix to a logical key range. Continuing the above example, the partitioning key range for partitioning token B would be partitioning key>=B.user.name.0 and partitioning key<=B.user.name.FFFFFFF.

In step 856, the k range queries are submitted to the associated key-value stores. For example, for k=2, the range queries would be partitioning key>=A.user.name.0 and partitioning key<=A.user.name.FFFFFFF and partitioning key>=B.user.name.0 and partitioning key<=B.user.name.FFFFFFF.

In step 858, results from each of the k range queries are merged and the combined data is returned back to the requester. For example, in FIG. 5F where k=2, two range queries are used for each column to retrieve columnar data from partition token prefix A and partition token prefix B. The combined data then forms a single result run per column.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system, comprising:
   a memory; and
   at least one processor coupled to the memory and configured to:
   receive data structured in a schemaless data representation, wherein the data comprises an array value and a key associated with the array value;
   generate, based on the key, a label path for an object of an ordered multi-map and an index path for the array value;
   transform, based on the label path for the object, the index path for the array value, and a value type of the array value, the data to a relational representation; and
   store the relational representation of the data in a key-value data store for a query-based retrieval.

2. The system of claim 1, wherein the schemaless data representation comprises a schemaless JavaScript Object Notation (JSON) hierarchical data representation.

3. The system of claim 2, wherein the data comprises an event data object, wherein the event data object comprises time series data from at least one of a plurality of sensors or a user device.

4. The system of claim 1, wherein the at least one processor configured to transform the data to the relational representation is further configured to transform a nested array in the data to a nested ordered multi-map.

5. The system of claim 4, wherein the at least one processor is further configured to transform the nested ordered multi-map to the relational representation.

6. The system of claim 1, wherein the at least one processor is further configured to:
   encode the relational representation to a columnar block of data; and
   store the columnar block in the key-value data store.

7. The system of claim 1, wherein the at least one processor is further configured to:
   distribute the relational representation of the data across a plurality of partitions, and wherein metadata is stored in the plurality of partitions with the relational representation of the data.

8. The system of claim 1, wherein the at least one processor is further configured to distinguish between an atomic value of the data and an array of a single value of the data.

9. The system of claim 1, wherein the at least one processor is further configured to distinguish between an array map element of the data and a nested array element of the data.

10. The system of claim 1, wherein the at least one processor is further configured to recognize a non-map root value of the data.

11. The system of claim 2, wherein wherein each JSON object of the schemaless JSON hierarchical data representation of the data comprises a different structure.

12. The system of claim 1, wherein the at least one processor is further configured to reconstruct original JSON formatted data without loss of information.

13. The system of claim 1, wherein the at least one processor is further configured to reconstruct a subset of original JSON formatted data.

14. The system of claim 1, wherein the at least one processor is further configured to encode the relational representation of the data into a plurality of columnar blocks of data.

15. The system of claim 1, wherein the at least one processor is further configured to optimize the query-based retrieval based on push down projection of columns of the relational representation of the data.

16. The system of claim 1, wherein the at least one processor is further configured to optimize the query-based retrieval based on push down predicate of time dimensions of the relational representation of the data.

17. A computer-implemented method, comprising:
   receiving, by a computing device, a data structure in a schemaless data representation, wherein the data structure comprises a value and a key associated with the value;
   generating, based on the key, a label path for an object of an ordered multi-map and an index path for the value;

transforming, based on the label path for the object, the index path for the value, and a value type of the value, the data structure to a relational representation of the data structure; and storing the relational representation of the data structure in a key-value data store for a query-based retrieval.

18. A non-transitory computer-readable medium having instructions stored thereon that, when executed by at least one computing device, causes the at least one computing device to perform operations comprising:

receiving data structured in a schemaless data representation, wherein the data comprises an array value and a key associated with the array value;

generating, based on the key, a label path for an object of an ordered multi-map and an index path for the array value;

transforming, based on the label path for the object, the index path for the array, and a value type of the array value, the data into a relational representation; and storing the relational representation of the data in a key-value data store for a query-based retrieval.

19. The computer-implemented method of claim 17, wherein the data comprises an event data object, wherein the event data object comprises time series data from at least one of a plurality of sensors or a user device.

20. The non-transitory computer-readable medium of claim 18, wherein the data comprises an event data object, wherein the event data object comprises time series data from at least one of a plurality of sensors or a user device.

* * * * *